(12) United States Patent
Bhushan et al.

(10) Patent No.: US 9,461,736 B2
(45) Date of Patent: Oct. 4, 2016

(54) METHOD AND APPARATUS FOR SUB-SLOT PACKETS IN WIRELESS COMMUNICATION

(75) Inventors: Naga Bhushan, San Diego, CA (US); Tamer Kadous, San Diego, CA (US); Mingxi Fan, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 882 days.

(21) Appl. No.: 11/676,960

(22) Filed: Feb. 20, 2007

(65) Prior Publication Data

US 2007/0195740 A1    Aug. 23, 2007

Related U.S. Application Data

(60) Provisional application No. 60/775,443, filed on Feb. 21, 2006, provisional application No. 60/775,693, filed on Feb. 21, 2006, provisional application No. 60/785,971, filed on Mar. 24, 2006.

(51) Int. Cl.
*H04B 7/216* (2006.01)
*H04B 7/26* (2006.01)
(Continued)

(52) U.S. Cl.
CPC ........... *H04B 7/2656* (2013.01); *H04L 1/0003* (2013.01); *H04L 1/0025* (2013.01);
(Continued)

(58) Field of Classification Search
CPC . H04L 5/0053; H04L 5/0007; H04L 1/0026; H04L 1/1671; H04L 1/1887; H04L 1/0003; H04L 5/0016; H04L 1/18; H04L 1/0025; H04L 5/0028; H04L 1/0007; H04W 28/06; H04W 88/04; H04W 7/2656
See application file for complete search history.

(56) References Cited

U.S. PATENT DOCUMENTS

| 6,078,572 A | 6/2000 | Tanno et al. |
| 6,130,886 A | 10/2000 | Ketseoglou et al. |

(Continued)

FOREIGN PATENT DOCUMENTS

| EP | 0959634 A2 | 11/1999 |
| EP | 0995275 | 4/2000 |

(Continued)

OTHER PUBLICATIONS

Overview of LNS proposal for Air Interface Evolution Phase 2 published Jan. 16, 2006 herein referred to as HRPD rev C.*

(Continued)

*Primary Examiner* — Ajit Patel
(74) *Attorney, Agent, or Firm* — Michael J DeHaemer, Jr.; Kenneth K D Vu

(57) ABSTRACT

Techniques for efficiently sending and receiving data in a wireless communication system are described herein. The techniques utilize a slot structure that is backward compatible with existing design. The techniques include sending and receiving forward link packets that occupy less than a full slot of the slot structure. An output waveform, which includes at least one slot, is generated at an access point. Each slot is segmented into two half-slots, wherein at least one half-slot includes a data unit of a packet. At a terminal, the output waveform is received and processed to extract the data unit and the data unit is processed to determine whether it is accurate. The terminal also generates ACK/NACK information in response to the results of processing the data unit and transmits channel information including the ACK/NACK information. The access point interprets the ACK/NACK information to determine if the data unit should be resent.

53 Claims, 17 Drawing Sheets

(51) Int. Cl.
*H04L 1/00* (2006.01)
*H04L 1/16* (2006.01)
*H04W 88/04* (2009.01)
*H04L 1/18* (2006.01)
*H04L 5/00* (2006.01)
*H04W 28/06* (2009.01)

(52) U.S. Cl.
CPC ........... *H04L1/0026* (2013.01); *H04L 1/1671* (2013.01); *H04L 1/1887* (2013.01); *H04L 5/0028* (2013.01); *H04L 5/0053* (2013.01); *H04W 88/04* (2013.01); *H04L 1/0007* (2013.01); *H04L 1/18* (2013.01); *H04L 5/0007* (2013.01); *H04L 5/0016* (2013.01); *H04W 28/06* (2013.01)

(56) References Cited

U.S. PATENT DOCUMENTS

| | | | |
|---|---|---|---|
| 6,694,469 | B1 | 2/2004 | Jalali et al. |
| 6,717,924 | B2 | 4/2004 | Ho et al. |
| 6,788,687 | B2 | 9/2004 | Bao et al. |
| 6,822,952 | B2 | 11/2004 | Abrol et al. |
| 6,882,632 | B1 | 4/2005 | Koo et al. |
| 6,912,214 | B2 | 6/2005 | Madour et al. |
| 6,963,534 | B1 | 11/2005 | Shorey et al. |
| 6,970,437 | B2 | 11/2005 | Lott et al. |
| 6,980,569 | B1 | 12/2005 | Beyda et al. |
| 6,987,780 | B2 | 1/2006 | Wei et al. |
| 7,002,900 | B2 | 2/2006 | Walton et al. |
| 7,042,869 | B1 | 5/2006 | Bender |
| 7,043,249 | B2 | 5/2006 | Sayeedi |
| 7,050,405 | B2 | 5/2006 | Attar et al. |
| 7,062,283 | B2 | 6/2006 | Dooley |
| 7,065,060 | B2 | 6/2006 | Yun et al. |
| 7,088,701 | B1 | 8/2006 | Attar et al. |
| 7,099,629 | B1 | 8/2006 | Bender |
| 7,127,654 | B2 | 10/2006 | Jalali et al. |
| 7,139,274 | B2 | 11/2006 | Attar et al. |
| 7,145,940 | B2 | 12/2006 | Gore et al. |
| 7,170,876 | B2 | 1/2007 | Wei et al. |
| 7,463,867 | B2 | 12/2008 | Luo et al. |
| 7,680,211 | B1 | 3/2010 | Von Der Embse |
| 7,764,981 | B2 | 7/2010 | Kalofonos et al. |
| 8,077,595 | B2 | 12/2011 | Bhushan et al. |
| 8,472,424 | B2 | 6/2013 | Bhushan et al. |
| 8,493,958 | B2 | 7/2013 | Attar et al. |
| 8,498,192 | B2 | 7/2013 | Bhushan et al. |
| 2001/0009555 | A1 | 7/2001 | Diepstraten et al. |
| 2002/0002704 | A1 | 1/2002 | Davis et al. |
| 2002/0145990 | A1 | 10/2002 | Sayeedi |
| 2002/0193112 | A1 | 12/2002 | Aoki et al. |
| 2003/0040315 | A1 | 2/2003 | Khaleghi et al. |
| 2003/0072254 | A1 | 4/2003 | Ma et al. |
| 2003/0153327 | A1 | 8/2003 | Tajiri et al. |
| 2003/0220103 | A1 | 11/2003 | Kim et al. |
| 2003/0235147 | A1 | 12/2003 | Walton et al. |
| 2004/0022203 | A1 | 2/2004 | Michelson et al. |
| 2004/0063431 | A1 | 4/2004 | Julka et al. |
| 2004/0095851 | A1 | 5/2004 | Ellner et al. |
| 2004/0141481 | A1 | 7/2004 | Lee et al. |
| 2004/0141523 | A1* | 7/2004 | Bhushan et al. ............ 370/469 |
| 2004/0147223 | A1 | 7/2004 | Cho |
| 2004/0228267 | A1 | 11/2004 | Agrawal et al. |
| 2004/0258134 | A1 | 12/2004 | Cho et al. |
| 2005/0063298 | A1 | 3/2005 | Ling et al. |
| 2005/0063345 | A1 | 3/2005 | Wu et al. |
| 2005/0073969 | A1 | 4/2005 | Hart et al. |
| 2005/0111397 | A1 | 5/2005 | Attar et al. |
| 2005/0111437 | A1 | 5/2005 | Maturi |
| 2005/0111599 | A1 | 5/2005 | Walton et al. |
| 2005/0135284 | A1 | 6/2005 | Nanda et al. |
| 2005/0135291 | A1 | 6/2005 | Ketchum et al. |
| 2005/0135318 | A1 | 6/2005 | Walton et al. |
| 2005/0135403 | A1 | 6/2005 | Ketchum et al. |
| 2005/0135416 | A1 | 6/2005 | Ketchum et al. |
| 2005/0141475 | A1 | 6/2005 | Vijayan et al. |
| 2005/0163262 | A1 | 7/2005 | Gupta |
| 2005/0195763 | A1 | 9/2005 | Kadous et al. |
| 2005/0249177 | A1 | 11/2005 | Huo et al. |
| 2005/0270969 | A1* | 12/2005 | Han et al. ............... 370/210 |
| 2005/0281290 | A1 | 12/2005 | Khandekar et al. |
| 2006/0013182 | A1 | 1/2006 | Balasubramanian et al. |
| 2006/0018397 | A1 | 1/2006 | Sampath et al. |
| 2006/0018411 | A1 | 1/2006 | Gore et al. |
| 2006/0023772 | A1 | 2/2006 | Mudulodu et al. |
| 2006/0078075 | A1 | 4/2006 | Stamoulis et al. |
| 2006/0088003 | A1 | 4/2006 | Harris |
| 2006/0133273 | A1 | 6/2006 | Julian et al. |
| 2006/0133521 | A1 | 6/2006 | Sampath et al. |
| 2006/0135080 | A1 | 6/2006 | Khandekar et al. |
| 2006/0136790 | A1 | 6/2006 | Julian et al. |
| 2006/0171295 | A1 | 8/2006 | Ihm et al. |
| 2006/0193338 | A1 | 8/2006 | Zheng et al. |
| 2006/0198344 | A1 | 9/2006 | Teague et al. |
| 2006/0203794 | A1 | 9/2006 | Sampath et al. |
| 2006/0203845 | A1 | 9/2006 | Monogioudis |
| 2006/0205413 | A1 | 9/2006 | Teague |
| 2006/0209732 | A1 | 9/2006 | Gorokhov et al. |
| 2006/0209927 | A1 | 9/2006 | Khandekar et al. |
| 2006/0217124 | A1 | 9/2006 | Bi et al. |
| 2006/0227887 | A1 | 10/2006 | Li et al. |
| 2006/0233124 | A1 | 10/2006 | Palanki |
| 2006/0233131 | A1 | 10/2006 | Gore et al. |
| 2006/0240784 | A1 | 10/2006 | Naguib et al. |
| 2006/0274712 | A1 | 12/2006 | Malladi et al. |
| 2006/0276212 | A1 | 12/2006 | Sampath et al. |
| 2006/0286974 | A1 | 12/2006 | Gore et al. |
| 2007/0010957 | A1 | 1/2007 | Sampath et al. |
| 2007/0011589 | A1 | 1/2007 | Palanki |
| 2007/0019535 | A1 | 1/2007 | Sambhwani et al. |
| 2007/0025325 | A1 | 2/2007 | Kumar |
| 2007/0025345 | A1 | 2/2007 | Bachl et al. |
| 2007/0030839 | A1 | 2/2007 | Vimpari et al. |
| 2007/0070942 | A1 | 3/2007 | Harris et al. |
| 2007/0071127 | A1 | 3/2007 | Gore et al. |
| 2007/0087749 | A1 | 4/2007 | Ionescu et al. |
| 2007/0195688 | A1 | 8/2007 | Bhushan et al. |
| 2007/0195723 | A1 | 8/2007 | Attar et al. |
| 2007/0195747 | A1 | 8/2007 | Attar et al. |
| 2007/0195899 | A1 | 8/2007 | Bhushan et al. |
| 2007/0195908 | A1 | 8/2007 | Attar et al. |
| 2007/0293172 | A1 | 12/2007 | Shi et al. |
| 2008/0151743 | A1 | 6/2008 | Tong et al. |
| 2009/0067405 | A1 | 3/2009 | Zhang et al. |
| 2009/0310702 | A1 | 12/2009 | Lewis |
| 2012/0014392 | A1 | 1/2012 | Bhushan et al. |
| 2012/0269052 | A1 | 10/2012 | Chen et al. |

FOREIGN PATENT DOCUMENTS

| | | |
|---|---|---|
| EP | 1367760 A2 | 12/2003 |
| EP | 1422851 | 5/2004 |
| EP | 1489775 A1 | 12/2004 |
| EP | 1513304 A2 | 3/2005 |
| EP | 1542488 A1 | 6/2005 |
| EP | 1565015 A2 | 8/2005 |
| EP | 1596525 A1 | 11/2005 |
| EP | 1608120 A2 | 12/2005 |
| EP | 1619847 A2 | 1/2006 |
| GB | 2394871 A | 5/2004 |
| JP | H10303848 A | 11/1998 |
| JP | 2000504908 T | 4/2000 |
| JP | 2000270024 | 9/2000 |
| JP | 2002320260 A | 10/2002 |
| JP | 2002374562 A | 12/2002 |
| JP | 2002544733 | 12/2002 |
| JP | 2003152679 A | 5/2003 |
| JP | 2003533078 | 11/2003 |
| JP | 2004158901 A | 6/2004 |
| JP | 2005510904 A | 4/2005 |
| JP | 2005323382 A | 11/2005 |
| JP | 2005536967 T | 12/2005 |
| JP | 2006270968 A | 10/2006 |

(56) References Cited

FOREIGN PATENT DOCUMENTS

| | | | |
|---|---|---|---|
| JP | 2009503912 A | | 1/2009 |
| KR | 20040029416 | | 4/2004 |
| KR | 2005120806 | | 12/2005 |
| RU | 2238611 C1 | | 10/2004 |
| RU | 2004117217 A | | 3/2005 |
| WO | WO0069203 | | 11/2000 |
| WO | WO0176110 A2 | | 10/2001 |
| WO | WO0180477 | | 10/2001 |
| WO | 02019605 | | 3/2002 |
| WO | WO03017688 A2 | | 2/2003 |
| WO | WO03034644 A1 | | 4/2003 |
| WO | WO03041298 | | 5/2003 |
| WO | 03096598 | | 11/2003 |
| WO | WO03096581 A1 | | 11/2003 |
| WO | WO2004004269 | | 1/2004 |
| WO | WO2004038984 A2 | | 5/2004 |
| WO | WO2004038988 | | 5/2004 |
| WO | WO2004056142 | | 7/2004 |
| WO | WO2004057894 A1 | | 7/2004 |
| WO | WO2004084450 | | 9/2004 |
| WO | WO2004095851 | | 11/2004 |
| WO | WO2004098098 | | 11/2004 |
| WO | WO2004114548 A1 | | 12/2004 |
| WO | WO2004114549 | | 12/2004 |
| WO | WO2005015775 A1 | | 2/2005 |
| WO | WO2005032001 A1 | | 4/2005 |
| WO | WO2005048640 | | 5/2005 |
| WO | WO2005067247 A1 | | 7/2005 |
| WO | WO2005071867 | | 8/2005 |
| WO | WO2005088882 | | 9/2005 |
| WO | WO2005125139 A1 | | 12/2005 |
| WO | 2006086497 A1 | | 8/2006 |

OTHER PUBLICATIONS

International Search Report—PCT/US07/062527—International Search Authority—European Patent Office—Nov. 7, 2007.
Taiwan Search Report—TW096106485—TIPO—Mar. 8, 2011.
Fan, et al.; "On the Reverse Link Performance of Cdma2000 1Xev-Do Revision a System", IEEE Xplore Online, Feb. 2005, pp. 2244-2250,XP002438335,New York, USA.
Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.
Ojanpera, T. et al.: "Frames—Hybrid Multiple Access Technology," IEEE International Symposium on Spread Spectrum Techniques and Applications, No. 1, Sep. 22, 1996, pp. 320-324.
Written Openion—PCT/US07/062527, International Search Authority—European Patent Office—Nov. 7, 2007.
Taiwan Search Report—TW096106486—TIPO—Jan. 10, 2011.
Taiwan Search Report—TW096106487—TIPO—Dec. 15, 2010.
Taiwanese Search report—096106482—TIPO Jan. 24, 2011.
Motorola, "Eutra Downlink Numerology and Design," 3GPP TSG RAN WG1 adhoc_LTE_AH_June-05 R1-050583, Jun. 21, 2005, pp. 1-10, JRL,http://www.3gpp.orgiftp/tsg_ran/WG1_RL1/TSGR1_AH/LTE_AH_June-05/Docs/R1-050583.zip.

* cited by examiner

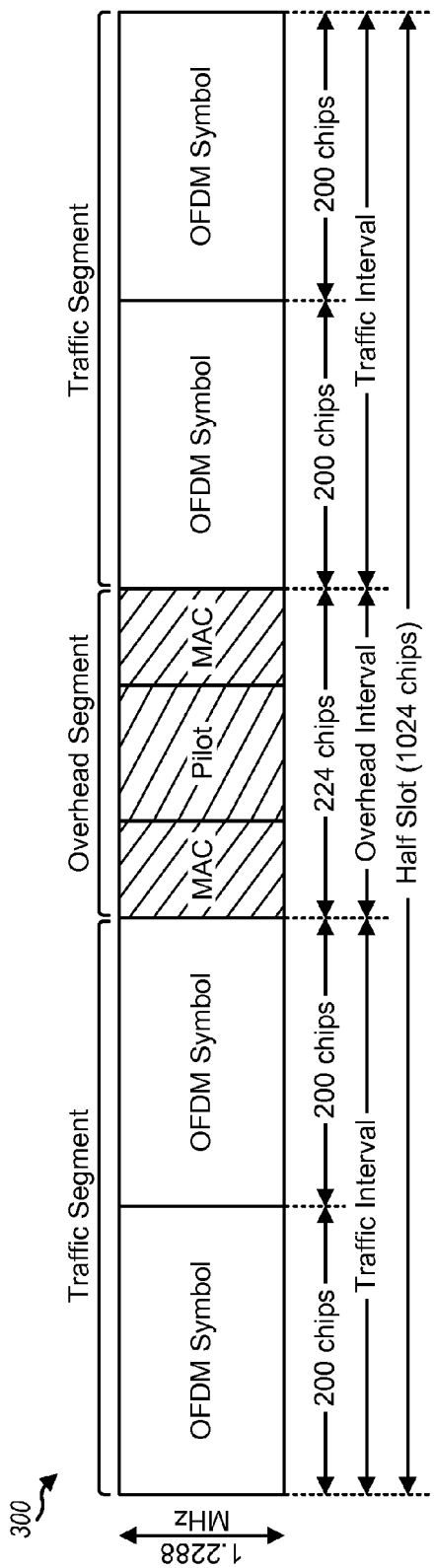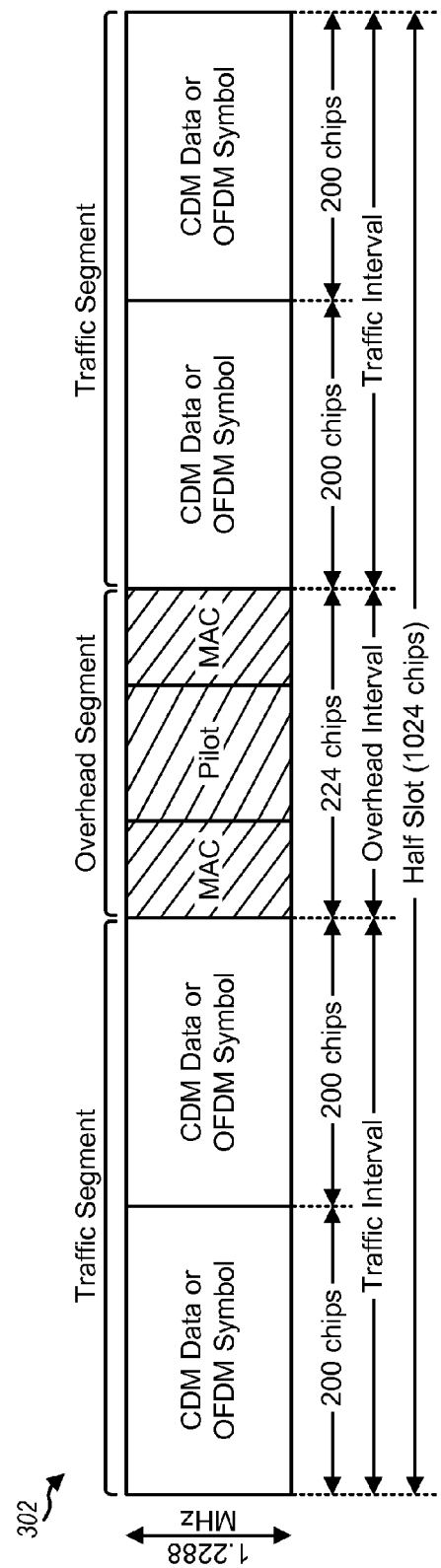

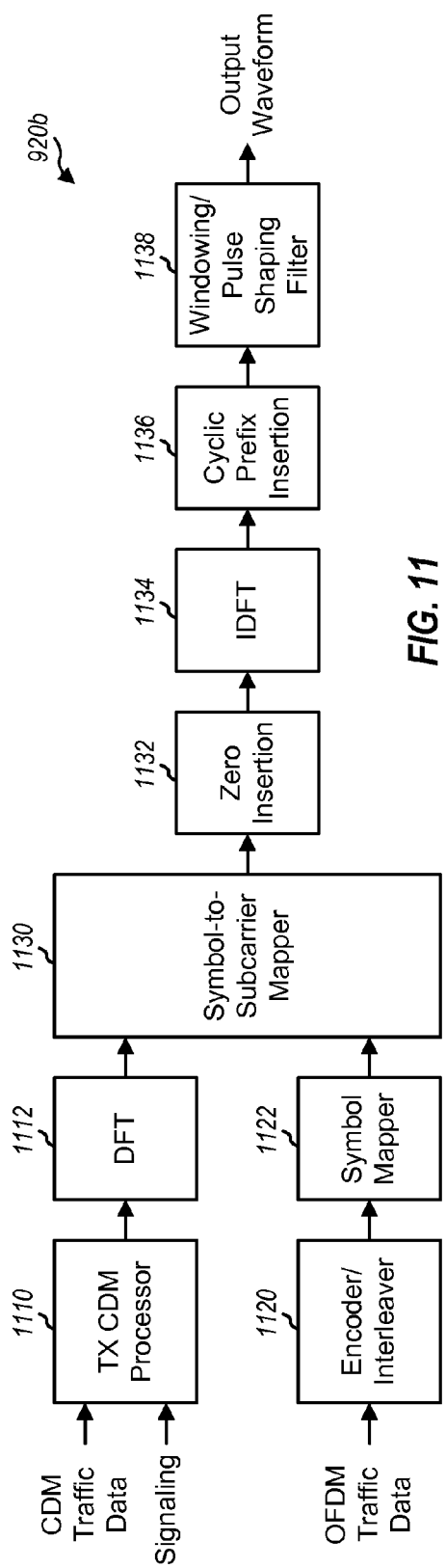
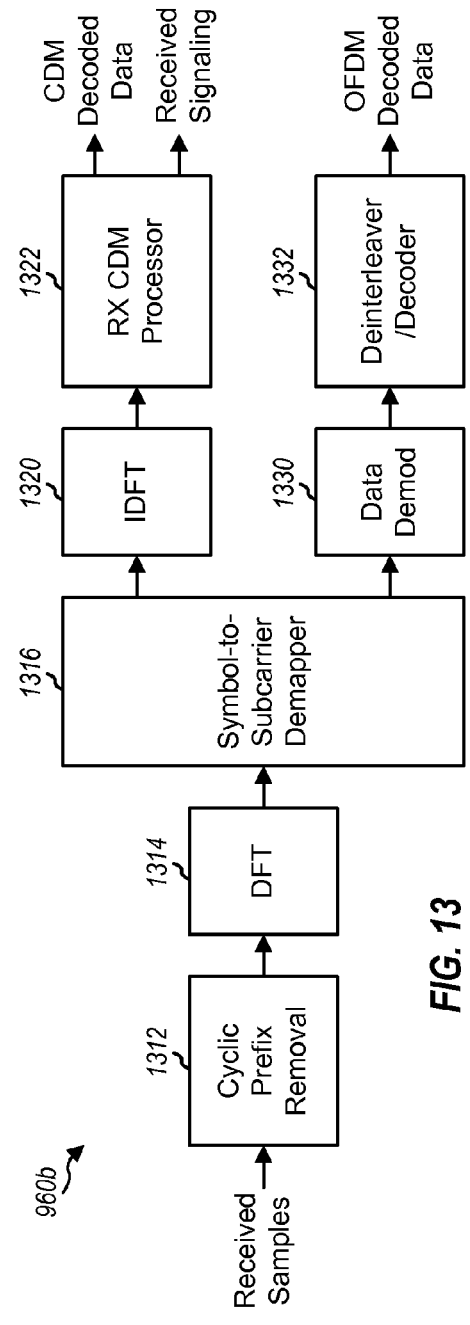
FIG. 11
FIG. 13

| Payload Size (bits) | Modulation order (2=QPSK, 3=8PSK, 4=16QAM, 6=64QAM) At | | | | | | | |
|---|---|---|---|---|---|---|---|---|
| | 1st Tx | 2nd Tx | 3rd Tx | 4th Tx | 5th Tx | 6th Tx | 7th Tx | 8th Tx |
| 256 | 2 | 2 | 2 | 2 | 2 | 2 | 2 | 2 |
| 512 | 2 | 2 | 2 | 2 | 2 | 2 | 2 | 2 |
| 1024 | 2 | 2 | 2 | 2 | 2 | 2 | 2 | 2 |
| 1536 | 3 | 2 | 2 | 2 | 2 | 2 | 2 | 2 |
| 2048 | 4 | 3 | 3 | 3 | 3 | 3 | 3 | 3 |
| 2560 | 6 | 3 | 3 | 3 | 3 | 3 | 3 | 3 |
| 3072 | 6 | 4 | 4 | 4 | 4 | 4 | 4 | 4 |
| 3584 | 6 | 4 | 4 | 4 | 4 | 4 | 4 | 4 |
| 4096 | 6 | 6 | 4 | 4 | 4 | 4 | 4 | 4 |
| 5120 | 6 | 6 | 4 | 4 | 4 | 4 | 4 | 4 |
| 6144 | 6 | 6 | 4 | 4 | 4 | 4 | 4 | 4 |
| 7168 | 6 | 6 | 4 | 4 | 4 | 4 | 4 | 4 |
| 8192 | 6 | 6 | 4 | 4 | 4 | 4 | 4 | 4 |
| 10240 | 6 | 6 | 6 | 6 | 4 | 4 | 4 | 4 |
| 12288 | 6 | 6 | 6 | 6 | 4 | 4 | 4 | 4 |
| 14336 | 6 | 6 | 6 | 6 | 6 | 4 | 4 | 4 |

FIG. 15

| Payload Size (bits) | Modulation order (2=QPSK, 3=8PSK, 4=16QAM, 6=64QAM) At | | | | | | | |
|---|---|---|---|---|---|---|---|---|
| | 1st Tx | 2nd Tx | 3rd Tx | 4th Tx | 5th Tx | 6th Tx | 7th Tx | 8th Tx |
| 256 | 307.2 | 153.6 | 102.4 | 76.8 | 61.4 | 51.2 | 43.9 | 38.4 |
| 512 | 614.4 | 307.2 | 204.8 | 153.6 | 122.9 | 102.4 | 87.8 | 76.8 |
| 1024 | 1228.8 | 614.4 | 409.6 | 307.2 | 245.8 | 204.8 | 175.5 | 153.6 |
| 1536 | 1843.2 | 921.6 | 614.4 | 460.8 | 368.6 | 307.2 | 263.3 | 230.4 |
| 2048 | 2457.6 | 1228.8 | 819.2 | 614.4 | 491.5 | 409.6 | 351.1 | 307.2 |
| 2560 | 3072.0 | 1536.0 | 1024.0 | 768.0 | 614.4 | 512.0 | 438.9 | 384.0 |
| 3072 | 3686.4 | 1843.2 | 1228.8 | 921.6 | 737.3 | 614.4 | 526.6 | 460.8 |
| 3584 | 4300.8 | 2150.4 | 1433.6 | 1075.2 | 860.2 | 716.8 | 614.4 | 537.6 |
| 4096 | 4915.2 | 2457.6 | 1638.4 | 1228.8 | 983.0 | 819.2 | 702.2 | 614.4 |
| 5120 | 6144.0 | 3072.0 | 2048.0 | 1536.0 | 1228.8 | 1024.0 | 877.7 | 768.0 |
| 6144 | 7372.8 | 3686.4 | 2457.6 | 1843.2 | 1474.6 | 1228.8 | 1053.3 | 921.6 |
| 7168 | 8601.6 | 4300.8 | 2867.2 | 2150.4 | 1720.3 | 1433.6 | 1228.8 | 1075.2 |
| 8192 | 9830.4 | 4915.2 | 3276.8 | 2457.6 | 1966.1 | 1638.4 | 1404.3 | 1228.8 |
| 10240 | 12288.0 | 6144.0 | 4096.0 | 3072.0 | 2457.6 | 2048.0 | 1755.4 | 1536.0 |
| 12288 | 14745.6 | 7372.8 | 4915.2 | 3686.4 | 2949.1 | 2457.6 | 2106.5 | 1843.2 |
| 14336 | 17203.2 | 8601.6 | 5734.4 | 4300.8 | 3440.6 | 2867.2 | 2457.6 | 2150.4 |

*FIG. 16*

METHOD AND APPARATUS FOR SUB-SLOT PACKETS IN WIRELESS COMMUNICATION

CLAIM OF PRIORITY UNDER 35 U.S.C. §119

The present Application for Patent claims priority to Provisional Application Ser. No. 60/775,443, entitled "Wireless Communication System and Method," and Provisional Application Ser. No. 60/775,693, entitled "DO Communication System and Method," both filed Feb. 21, 2006, and Provisional Application Ser. No. 60/785,971, entitled "QUALCOMM Proposal for 3GPP2 Air Interface Evolution Phase 2," filed Mar. 24, 2006, and assigned to the assignee hereof, and expressly incorporated herein by reference.

BACKGROUND

I. Field

The present disclosure relates generally to communication, and more specifically to transmission techniques for a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A multiple-access system may utilize one or more multiplexing schemes such as code division multiplexing (CDM), time division multiplexing (TDM), etc. The system may be deployed and may serve existing terminals. These multiple access systems may conventionally include packets that occupy one or more slots in the transmission. It may be desirable to improve the performance of the system while retaining backward compatibility for the existing terminals. For example, it may be desirable to employ spatial techniques such as multiple-input multiple-output (MIMO) and spatial division multiple access (SDMA) to improve throughput and/or reliability by exploiting additional spatial dimensionalities provided by use of multiple antennas.

There is therefore a need in the art for transmission techniques for forward link packets that can support packets that occupy less than a conventional slot. Furthermore, there is a need for transmission techniques that can support spatial techniques while retaining backward compatibility for existing terminals.

SUMMARY

Techniques for efficiently sending and receiving data in a wireless communication system are described herein. The techniques utilize a slot structure that is backward compatible with existing design. The techniques include sending and receiving forward link packets that occupy less than a full slot of the slot structure. The techniques also selectively employ orthogonal frequency division multiplexing (OFDM) to efficiently support spatial techniques and/or other advanced communication techniques.

According to an aspect, an access point includes a receiver, at least one processor, a memory coupled to the at least one processor, and a transmitter configured for transmitting the output waveform. The receiver is configured to receive channel information from a remote station with the channel information including ACK/NACK (acknowledgement/negative acknowledgement) information. The at least one processor is configured to generate an output waveform comprising at least one slot. Each slot is segmented into two half-slots, wherein at least one half-slot includes a data unit of a packet. The at least one processor is also configured to interpret the ACK/NACK information to determine if the data unit should be resent to the remote station.

According to another aspect, a terminal apparatus includes at least one processor, a memory coupled to the at least one processor, and a transmitter for transmitting channel information comprising ACK/NACK information. The at least one processor is configured to process an input waveform comprising at least one slot. Each slot is segmented into two half-slots, wherein at least one half-slot includes a data unit of a packet. The at least one processor is further configured to process the data unit to determine whether the data unit is accurate and generate ACK/NACK information responsive to the result of processing the data unit.

According to another aspect, a communication system includes the access point and the terminal, both described above, in communication with each other to communicate the output waveform in a forward link and communicate the ACK/NACK information in a reverse link.

According to yet another aspect, a method includes generating an output waveform at an access point. The output waveform includes at least one slot. Each slot is segmented into two half-slots, wherein at least one half-slot includes a data unit of a packet. The method also includes processing the output waveform to extract the data unit and processing the data unit to determine whether the data unit is accurate at a terminal. Also performed by the terminal are the processes of generating ACK/NACK information in response to the results of processing the data unit and transmitting channel information comprising the ACK/NACK information. The method also includes interpreting the ACK/NACK information at the access point to determine if the data unit should be resent.

Various aspects and features of the disclosure are described in further detail below.

BRIEF DESCRIPTION OF THE DRAWINGS

FIG. 3A shows a single-carrier slot structure that supports OFDM.

FIG. 3B shows a single-carrier slot structure that supports CDM and OFDM.

FIG. 11 shows another design of a TX CDM/OFDM processor.

FIG. 13 shows another design of an RX CDM/OFDM processor.

FIG. 15 shows various modulation orders relative to payload size and number of re-tries.

FIG. 16 shows various data rates that may be achieved relative to payload size and number of re-tries.

DETAILED DESCRIPTION

The transmission techniques described herein may be used for various wireless communication systems such as CDMA, TDMA, FDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Long Term Evolution (LTE), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

For clarity, various aspects of the techniques are described below for a High Rate Packet Data (HRPD) system that implements IS-856. HRPD is also referred to as Evolution-Data Optimized (EV-DO), Data Optimized (DO), High Data Rate (HDR), etc. The terms HRPD and EV-DO are used often interchangeably. Currently, HRPD Revisions (Revs.) 0, A, and B have been standardized, HRPD Revs. 0 and A are deployed, and HRPD Rev. C is under development. HRPD Revs. 0 and A cover single-carrier HRPD (1xHRPD). HRPD Rev. B covers multi-carrier HRPD and is backward compatible with HRPD Revs. 0 and A. The techniques described herein may be incorporate in any HRPD revision. For clarity, HRPD terminology is used in much of the description below.

Figure 1:
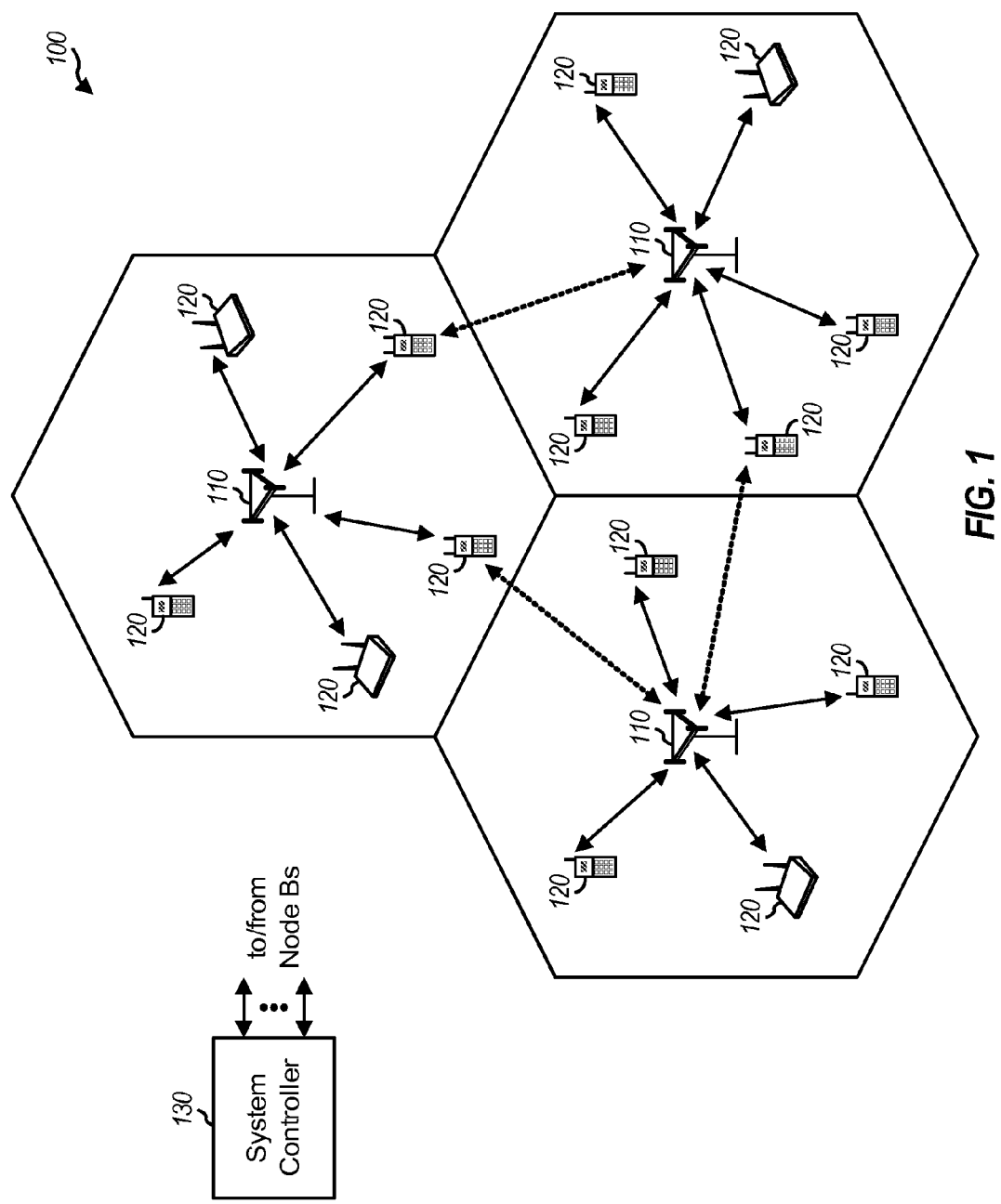
FIG. 1 shows a High Rate Packet Data (HRPD) communication system.

FIG. 1 shows an HRPD communication system 100 with multiple access points 110 and multiple terminals 120. An access point is generally a fixed station that communicates with the terminals and may also be referred to as a base station, a Node B, etc. Each access point 110 provides communication coverage for a particular geographic area and supports communication for the terminals located within the coverage area. Access points 110 may couple to a system controller 130 that provides coordination and control for these access points. System controller 130 may include network entities such as a Base Station Controller (BSC), a Packet Control Function (PCF), a Packet Data Serving Node (PDSN), etc.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless device, a handheld device, a wireless modem, a laptop computer, etc. A terminal may support any HRPD Revisions. In HRPD, a terminal may receive a transmission on the forward link from one access point at any given moment and may send a transmission on the reverse link to one or more access points. The forward link (or downlink) refers to the communication link from the access points to the terminals, and the reverse link (or uplink) refers to the communication link from the terminals to the access points.

Figure 2:
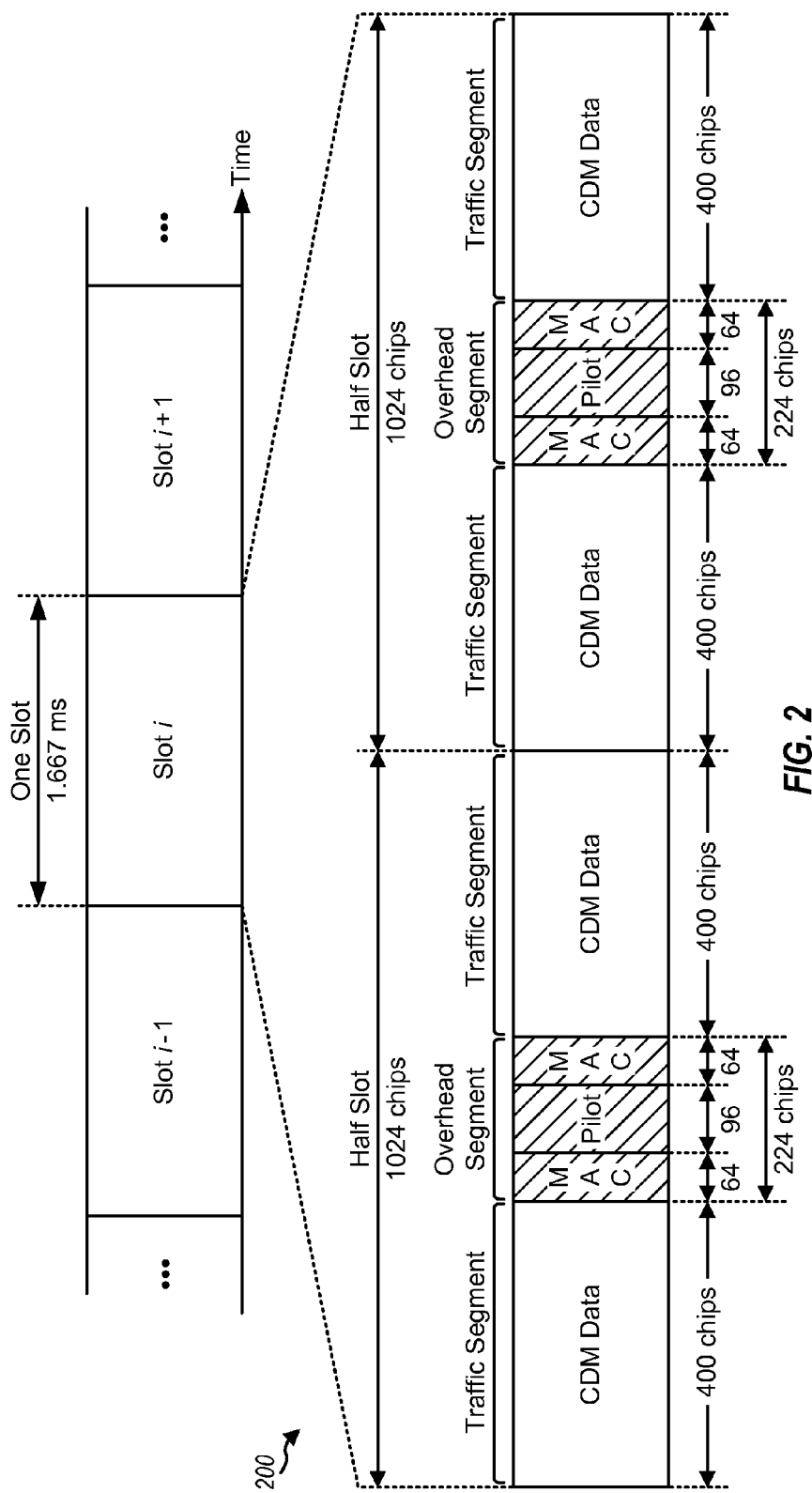
FIG. 2 shows a single-carrier slot structure that supports CDM.

FIG. 2 shows a single-carrier slot structure 200 that supports CDM on the forward link in HRPD. The transmission timeline is partitioned into slots. Each slot has a duration of 1.667 milliseconds (ms) and spans 2048 chips. Each chip has a duration of 813.8 nanoseconds (ns) for a chip rate of 1.2288 mega chips/second (Mcps). Each slot is divided into two identical half-slots. Each half-slot includes (i) an overhead segment composed of a pilot segment at the center of the half-slot and two Media Access Control (MAC) segments on both sides of the pilot segment and (ii) two traffic segments on both sides of the overhead segment. The traffic segments may also be referred to as traffic channel segments, data segments, data fields, etc. The pilot segment carries pilot and has a duration of 96 chips. Each MAC segment carries signaling (e.g., reverse power control (RPC) information) and has a duration of 64 chips. Each traffic segment carries traffic data (e.g., unicast data for specific terminals, broadcast data, etc.) and has a duration of 400 chips.

HRPD Revs. 0, A and B use CDM for data sent in the traffic segments. A traffic segment may carry CDM data for one or more terminals being served by an access point. The traffic data for each terminal may be processed based on coding and modulation parameters determined by channel feedback received from that terminal to generate data symbols. The data symbols for the one or more terminals may be demultiplexed and covered with 16-chip Walsh functions or codes to generate the CDM data for the traffic segment. The CDM data is thus generated in the time domain using Walsh functions. A CDM traffic segment is a traffic segment carrying CDM data.

It may be desirable to use OFDM and/or single-carrier frequency division multiplexing (SC-FDM) for data sent in the traffic segments. OFDM and SC-FDM partition the available bandwidth into multiple orthogonal subcarriers, which are also referred to as tones, bins, etc. Each subcarrier may be modulated with data. In general, modulation symbols are sent in the frequency domain with OFDM and in the time domain with SC-FDM. OFDM and SC-FDM have certain desirable characteristics such as the ability to readily combat intersymbol interference (ISI) caused by frequency selective fading. OFDM can also efficiently support MIMO and SDMA, which may be applied independently on each subcarrier and may thus provide good performance in a frequency selective channel. For clarity, the use of OFDM to send data is described below.

It may be desirable to support OFDM while retaining backward compatibility with HRPD Revs. 0, A and B. In HRPD, the pilot and MAC segments may be demodulated by all active terminals at all times whereas the traffic segments may be demodulated by only the terminals being served. Hence, backward compatibility may be achieved by retaining the pilot and MAC segments and modifying the traffic segments. OFDM data may be sent in an HRPD waveform by replacing the CDM data in a given 400-chip traffic segment with one or more OFDM symbols having a total duration of 400 chips or less.

FIG. 3A shows a single-carrier slot structure 300 that supports OFDM in HRPD. For simplicity, only one half-slot is shown in FIG. 3A. The half-slot includes (i) an overhead segment composed of a 96-chip pilot segment at the center of the half-slot and two 64-chip MAC segments on both sides of the pilot segment and (ii) two traffic segments on both sides of the overhead segment. In general, each traffic segment and (ii) the sample rate for the OFDM symbols is an integer multiple of the chip rate for the CDM data. The numerologies are further selected such that the total number of subcarriers, which determines a discrete Fourier transform (DFT) size, allow for efficient generation of the OFDM symbols. For these numerologies, the total number of subcarriers is not a power of 2 but has small prime factors. For example, 90 subcarriers may be obtained with prime factors of 2, 3, 3 and 5. The small prime factors may allow for efficient mixed-radix fast Fourier transform (FFT) implementations to generate the OFDM symbols. The numerologies shown in Table 1 allow for efficient embedding of OFDM data in the HRPD forward link waveform.

TABLE 1

| Parameter | Normal OFDM Symbol Numerology 1 | Normal OFDM Symbol Numerology 2 | OFDM Normal Symbol Numerology 3 | Unit |
|---|---|---|---|---|
| Sample rate | 1.2288 × n | 1.2288 × n | 1.2288 × n | Msps |
| Number of subcarriers | 90 × n | 180 × n | 360 × n | |
| Subcarrier spacing | 13.65333 . . . | 6.82666 . . . | 3.41333 . . . | KHz |
| Useful portion | 90 ($73.2421875\ \mu s$) | 180 ($146.484375\ \mu s$) | 360 ($292.96875\ \mu s$) | chips |
| Cyclic prefix length | 7.5 ($\approx 6.10\ \mu s$) | 16 ($\approx 13.02\ \mu s$) | 36 ($\approx 29.30\ \mu s$) | chips |
| Guard time for windowing | 2.5 ($\approx 2.03\ \mu s$) | 4 ($\approx 3.26\ \mu s$) | 4 ($\approx 3.26\ \mu s$) | chips |
| OFDM symbol duration | 100 ($\approx 81.38\ \mu s$) | 200 ($\approx 162.76\ \mu s$) | 400 ($\approx 325.52\ \mu s$) | chips | segment may carry one or more OFDM symbols. In the example shown in FIG. 3A, each traffic segment carries two OFDM symbols, and each OFDM symbol has a duration of 200 chips and is sent in one OFDM symbol period of 200 chips.

FIG. 3B shows a single-carrier slot structure 302 that supports CDM and OFDM in HRPD. A half-slot includes (i) an overhead segment composed of a 96-chip pilot segment and two 64-chip MAC segments and (ii) two traffic segments on both sides of the overhead segment. In one design, CDM or OFDM may be selected for each traffic segment. In this design, each traffic segment may carry CDM data if CDM is selected or one or more OFDM symbols if OFDM is selected. In other design, a traffic segment may carry both CDM data and OFDM data. For example, a traffic segment may carry CDM data in half of the traffic segment and one or more OFDM symbols in the other half of the traffic segment.

In general, OFDM symbols may be generated based on various OFDM symbol numerologies or designs. Each OFDM symbol numerology is associated with specific values for pertinent parameters such as OFDM symbol duration, number of subcarriers, cyclic prefix length, etc. The OFDM symbol duration should be an integer divisor of the 400-chip traffic segment in order to fully utilize the traffic segment. Furthermore, the sample rate for the OFDM symbols should be an integer multiple of the chip rate for the CDM data in order to simplify processing at the access points and terminals.

Table 1 lists three example OFDM symbol numerologies for HRPD. These numerologies are selected to be compatible with HRPD slot structure and chip rate so that (i) an integer number of OFDM symbols is sent in a traffic Any of the OFDM symbol numerologies in Table 1 may be used to replace CDM data in a traffic segment with OFDM data. These OFDM symbol numerologies provide different tradeoffs with respect to Doppler spread and multipath delay tolerance. Numerology 1 has the largest subcarrier spacing and the shortest cyclic prefix as compared to numerologies 2 and 3. Hence, numerology 1 may provide better Doppler tolerance (due to the larger subcarrier spacing) and may enable high spectral efficiency in high-speed vehicular channels at the expense of lower delay tolerance (due to the shorter cyclic prefix). Numerology 3 has the smallest subcarrier spacing and the longest cyclic prefix as compared to numerologies 1 and 2. Hence, numerology 3 may provide lower Doppler tolerance (due to the smaller subcarrier spacing) but higher delay tolerance (due to the longer cyclic prefix), which may enable high spectral efficiency in the presence of large multipath delays such as those induced by repeaters.

Other OFDM symbol numerologies may also be used for the traffic segments. In general, the OFDM symbol numerologies may be selected such that (i) the OFDM symbol duration and sample rate are compatible with the HRPD slot format and chip rate, respectively, and (ii) the DFT size allows for efficient OFDM symbol generation. This may then allow for replacement of CDM data in the HRPD forward link waveform with OFDM data in an efficient and backward compatible manner. CDM data may be selectively replaced with OFDM data in each traffic segment. Overhead segments may be retained for backward compatibility.

In one design, a fixed OFDM symbol numerology is used for all traffic segments carrying OFDM data. The terminals may know this OFDM symbol numerology a priori and may be able to demodulate the OFDM data without any signaling on numerology.

In another design, configurable OFDM symbol numerology may be used for a given traffic segment carrying OFDM data. A set of numerologies (e.g., those listed in Table 1) may be supported. Different numerologies may be used for different terminals. A suitable numerology may be selected for each terminal based on the channel conditions of that terminal. For example, numerology 1 may be used for a terminal traveling at high speed, numerology 3 may be used for a terminal with large multipath delay spread, and numerology 2 may be used for a terminal with moderate speed and/or moderate multipath delay spread.

Figure 4:
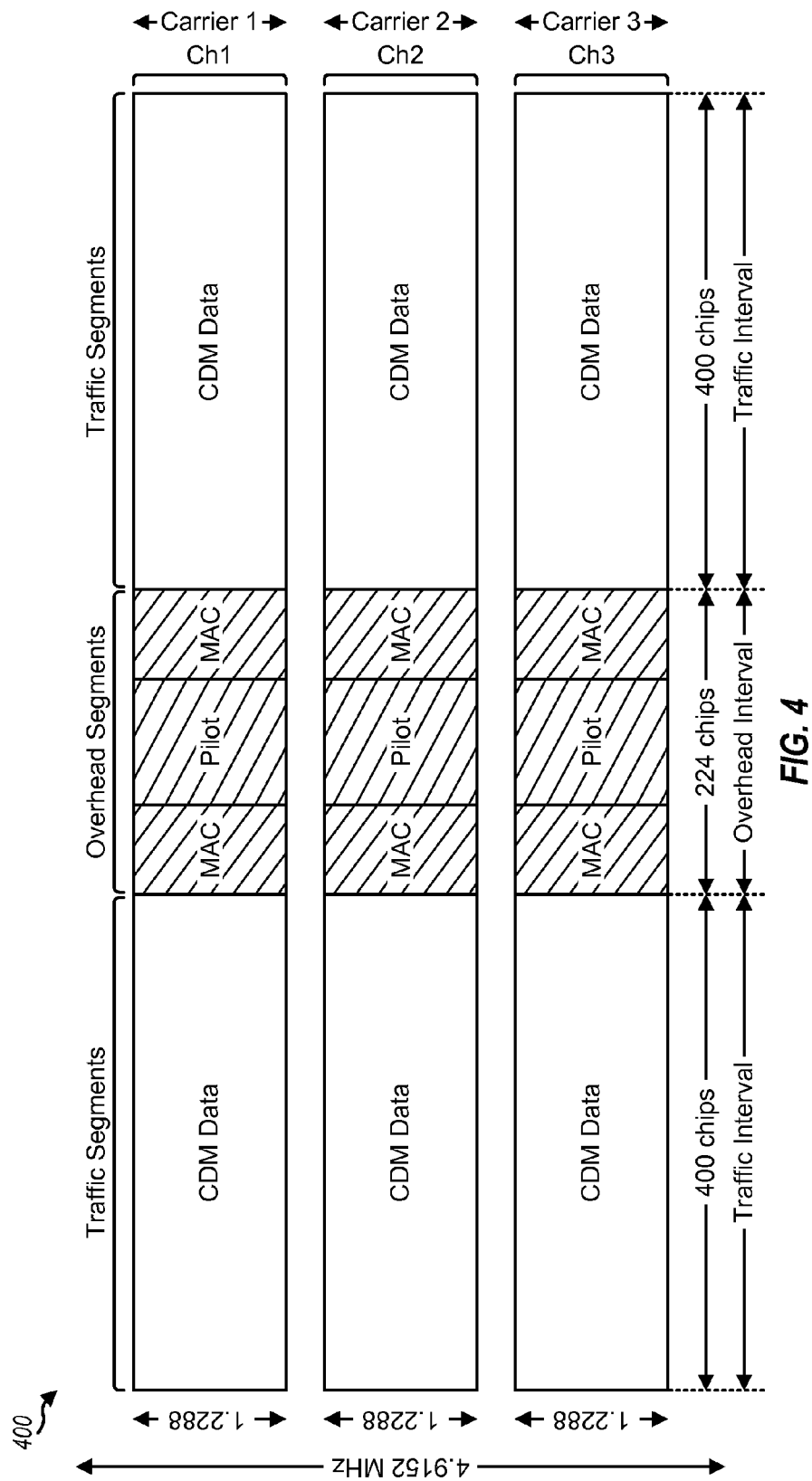
FIG. 4 shows a multi-carrier slot structure that supports CDM.

FIG. 4 shows a multi-carrier slot structure 400 that supports CDM in HRPD. In HRPD Rev. B, multiple 1xHRPD waveforms may be multiplexed in the frequency domain to obtain a multi-carrier HRPD waveform that fills a given spectral allocation. In the example show in FIG. 4, three 1xHRPD waveforms for three HRPD carriers 1, 2 and 3 are frequency multiplexed in a 5 MHz spectral allocation. Each 1xHRPD waveform is generated for a different carrier and occupies approximately 1.25 MHz. The three 1xHRPD waveforms occupy approximately 3×1.25=3.75 MHz, which may leave relatively large guard bands at both edges of the 5 MHz spectral allocation. The spacing between adjacent carriers is not specified in HRPD but is typically selected to provide a small transition band between adjacent 1xHRPD waveforms.

As shown in FIG. 4, the multi-carrier HRPD waveform includes three overhead segments and six traffic segments for the three carriers in each half-slot. Each traffic segment may carry CDM data, as shown in FIG. 4. The CDM data in each traffic segment in the multi-carrier HRPD waveform may be selectively replaced with OFDM data. Furthermore, the traffic and overhead segments in the multi-carrier HRPD waveform may be arranged to efficiently utilize the spectral allocation.

Figure 5:
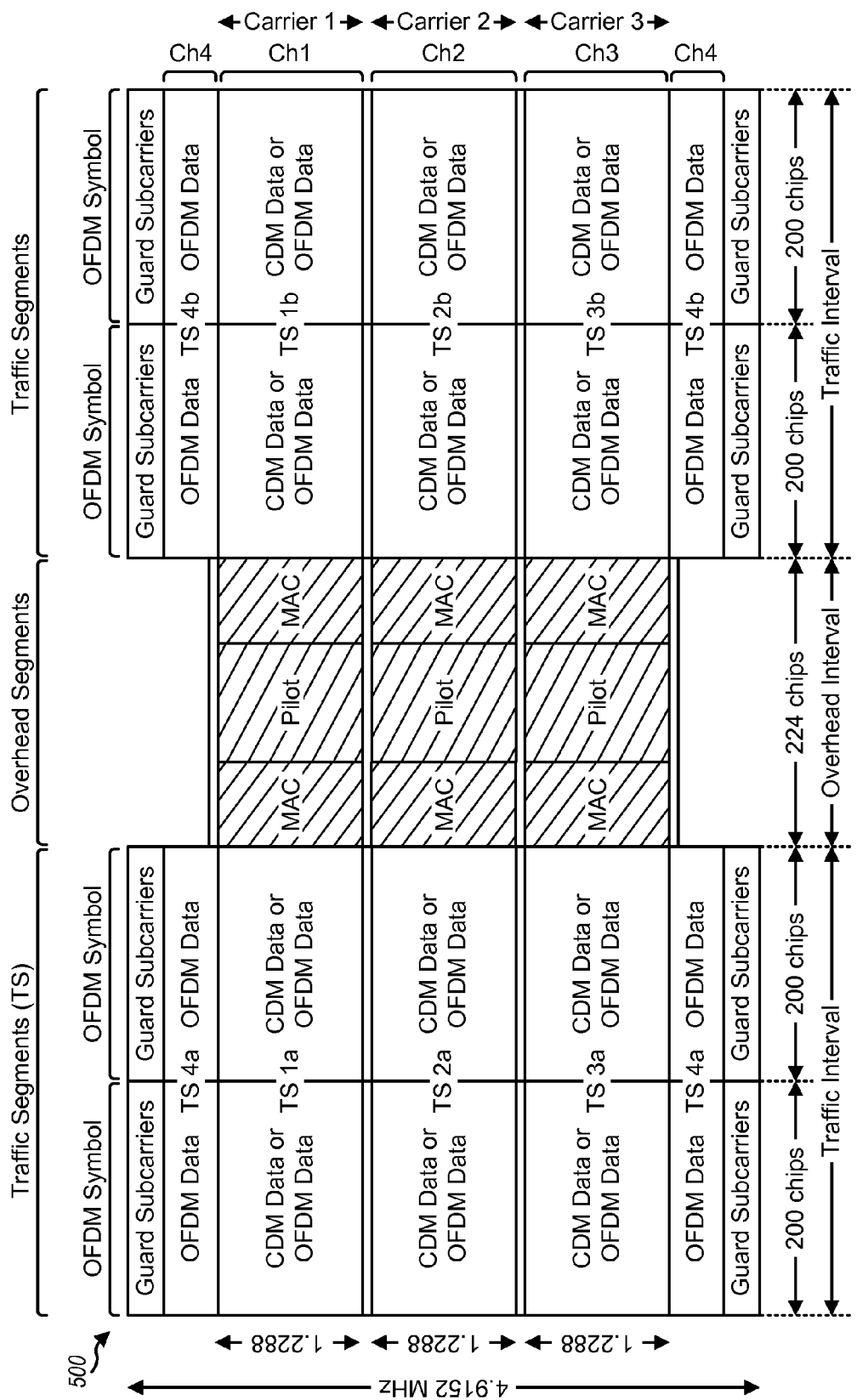
FIG. 5 shows a multi-carrier slot structure that supports CDM and OFDM.

FIG. 5 shows a multi-carrier slot structure 500 that supports CDM and OFDM in HRPD. In the example shown in FIG. 5, three HRPD carriers are sent in a 5 MHz spectral allocation and are spaced as close as possible in order to improve bandwidth utilization. For each HRPD carrier, each half-slot includes (i) an overhead segment composed of the pilot and MAC segments and (ii) two traffic segments on both sides of the overhead segment. HRPD carrier 1 includes traffic segments (TS) 1a and 1b to the left and right of the overhead segment, HRPD carrier 2 includes traffic segments 2a and 2b to the left and right of the overhead segment, and HRPD carrier 3 includes traffic segments 3a and 3b to the left and right of the overhead segment. Each traffic segment for each HRPD carrier may carry CDM data or OFDM data.

For 3-carrier HRPD in 5 MHz spectral allocation, OFDM symbols may be generated at a sample rate of 4×1.2288=4.9152 Mcps for n=4, as shown in FIG. 5. The OFDM symbols may then occupy most of the 5 MHz spectral allocation. Alternatively, the OFDM symbols may be generated at a sample rate of 3×1.2288=3.6864 Mcps for n=3, which is not shown in FIG. 5.

An OFDM symbol may be generated for each OFDM symbol period in a traffic interval. Each OFDM symbol period is 200 chips with OFDM symbol numerology 2 in Table 1. An OFDM symbol may carry OFDM data on (i) subcarriers corresponding to traffic segments used for OFDM and (ii) remaining usable subcarriers at both edges of the spectral allocation. The OFDM symbol may also be nulled out on subcarriers corresponding to traffic segments with CDM data. The OFDM symbol may thus carry OFDM data that may selectively replace CDM data in zero or more traffic segments for zero or more HRPD carriers. OFDM allows for better utilization of the available spectrum in the 5 MHz spectral allocation.

The spacing between HRPD carriers may be selected based on various factors such as a pulse shaping filter used for CDM, the manner in which CDM data and/or OFDM data is generated, etc. Guard subcarriers, which are subcarriers with no transmission, may be used at both edges of the spectral allocation. The number of guard subcarriers at the band edges may be selected based on spurious emission requirements and/or other factors.

Figure 6:
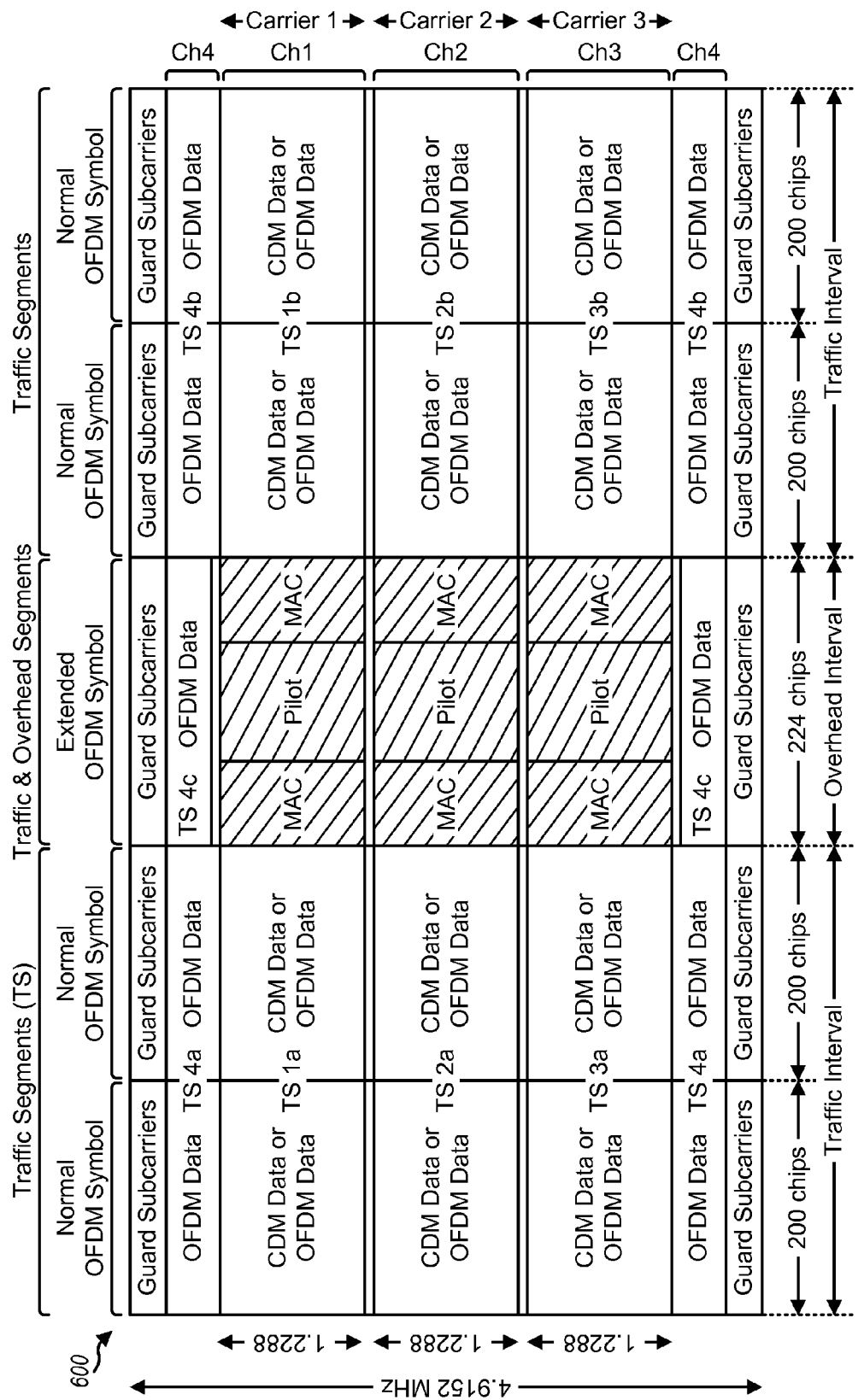
FIG. 6 shows another multi-carrier slot structure that supports CDM and OFDM.

FIG. 6 shows a multi-carrier slot structure 600 that supports CDM and OFDM in HRPD and more fully utilize the available bandwidth. Slot structure 600 includes all of the traffic and overhead segments in slot structure 500 in FIG. 5. Slot structure 600 further includes OFDM data in spectral portions that are not used for the pilot or MAC segments in the 224-chip overhead interval.

Additional OFDM symbol numerologies may be defined for the 224-chip overhead interval covering the pilot and MAC segments. These numerologies may be selected such that (i) an integer number of OFDM symbols may be sent in the overhead interval and (ii) the sample rate for the OFDM symbols is an integer multiple of the chip rate. Table 2 lists two example OFDM symbol numerologies for the overhead interval. The OFDM symbols sent in the overhead interval are referred to as "long" OFDM symbols because their durations are longer than the durations of the "normal" OFDM symbols sent in the traffic intervals with the corresponding numerologies in Table 1.

TABLE 2

| Parameter | Long OFDM Symbol Numerology 1 | Long OFDM Symbol Numerology 2 | Unit |
|---|---|---|---|
| Sample rate | 1.2288 × n | 1.2288 × n | Msps |
| Number of subcarriers | 100 × n | 200 × n | |
| Subcarrier spacing | 12.288 . . . | 6.144 . . . | KHz |
| Useful portion | 100 (≈81.38 μs) | 200 (≈162.76 μs) | chips |
| Cyclic prefix length | 8 (≈6.51 μs) | 20 (≈16.28 μs) | chips |
| Guard time for windowing | 4 (≈3.26 μs) | 4 (≈3.26 μs) | chips |
| OFDM symbol duration | 112 (≈91.15 μs) | 224 (≈182.29 μs) | chips |

Other OFDM symbol numerologies may also be used for the overhead interval. In general, the OFDM symbol numerologies may be selected such that (i) the OFDM symbol duration and sample rate are compatible with the HRPD slot format and chip rate, respectively, and (ii) the DFT size allows for efficient OFDM symbol generation.

An OFDM symbol may be generated for each OFDM symbol period in the overhead interval as described below. The OFDM symbol may carry OFDM data in subcarriers corresponding to the portions of the bandwidth that are not used for the pilot and MAC segments. The OFDM symbol may be nulled out on subcarriers corresponding to the pilot and MAC segments. Overall spectral utilization may be improved by using one or more long OFDM symbols in the overhead interval.

In the designs shown in FIGS. 5 and 6, four logical channels Ch1, Ch2, Ch3 and Ch4 may be defined for the traffic segments. These logical channels may also be referred to as data channels, traffic channels, etc. Logical channel Ch1 may include traffic segments 1a and 1b sent on HRPD carrier 1, logical channel Ch2 may include traffic segments 2a and 2b sent on HRPD carrier 2, logical channel Ch3 may include traffic segments 3a and 3b sent on HRPD carrier 3, and logical channel Ch4 may include traffic segments 4a, 4b and 4c sent on the remaining usable spectrum. Logical channels Ch1, Ch2 and Ch3 thus correspond to subcarriers that overlap with HRPD carriers 1, 2 and 3, respectively. Logical channels Ch1, Ch2 and Ch3 may switch between CDM and OFDM in each slot, each half-slot, etc. Logical channel Ch4 has no associated HRPD carrier and may be used to improve bandwidth utilization. Logical channel Ch4 may also be partitioned into two logical subchannels, e.g., a lower Ch4 and an upper Ch4, with each logical subchannel including a contiguous set of subcarriers. The logical channels may be scheduled independently. For example, each logical channel may be scheduled based on channel quality feedback received from the terminals for that logical channel.

In general, any number of HRPD carriers may be sent in a given spectral allocation. For each HRPD carrier, each traffic segment may carry CDM data or OFDM data. OFDM data may also be sent in remaining usable spectrum not used by the HRPD carriers.

Figure 7:
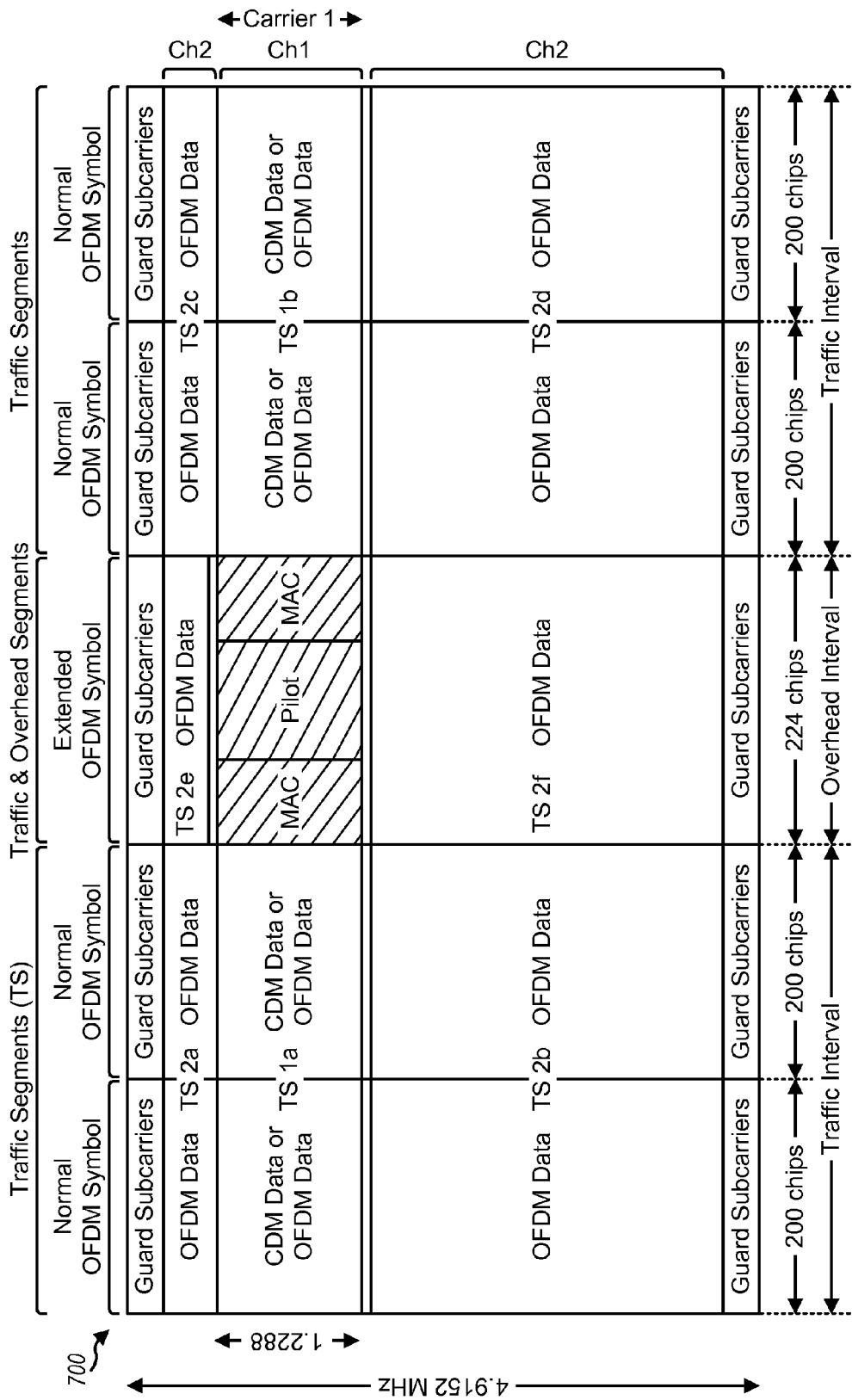
FIG. 7 shows a slot structure that supports OFDM and CDM.

FIG. 7 shows a slot structure 700 that supports OFDM and CDM for a single HRPD carrier in a 5 MHz spectral allocation. In the example shown in FIG. 7, the single HRPD carrier is located near one edge of the 5 MHz spectral allocation. The pilot and MAC segments for the HRPD carrier are generated and sent in the center of the half-slot, as described above in FIGS. 2 through 6. Each traffic segment of the HRPD carrier may carry CDM data or OFDM data.

An OFDM spectrum may be defined to include all usable spectrum in the spectral allocation except for the HRPD carrier. In the example shown in FIG. 7, the OFDM spectrum includes the usable spectrum on both sides of the HRPD carrier. The normal and long OFDM symbols may be expanded and used to carry data in the OFDM spectrum. Traffic data, signaling and pilot may be sent in the OFDM spectrum in any manner, e.g., using any techniques commonly used in systems employing just OFDM or OFDMA. For example, pilot and signaling may be sent in any manner on any subcarriers and symbol periods. The available subcarriers and symbol periods may also be allocated to any number of terminals, and data may be sent to the scheduled terminals in any manner.

In the design shown in FIG. 7, two logical channels Ch1 and Ch2 are defined. Logical channel Ch1 includes traffic segments 1a and 1b sent on HRPD carrier 1, and logical channel Ch2 includes traffic segments 2a through 2f sent on the OFDM spectrum. Logical channel Ch1 may switch between CDM and OFDM in each slot, each half-slot, etc. Logical channel Ch2 is not bound to any HRPD carrier and may be operated in a pure OFDM mode to carry just OFDM data. Traffic data, signaling, and/or pilot may be sent with OFDM in any manner on logical channel Ch2.

Figure 8:
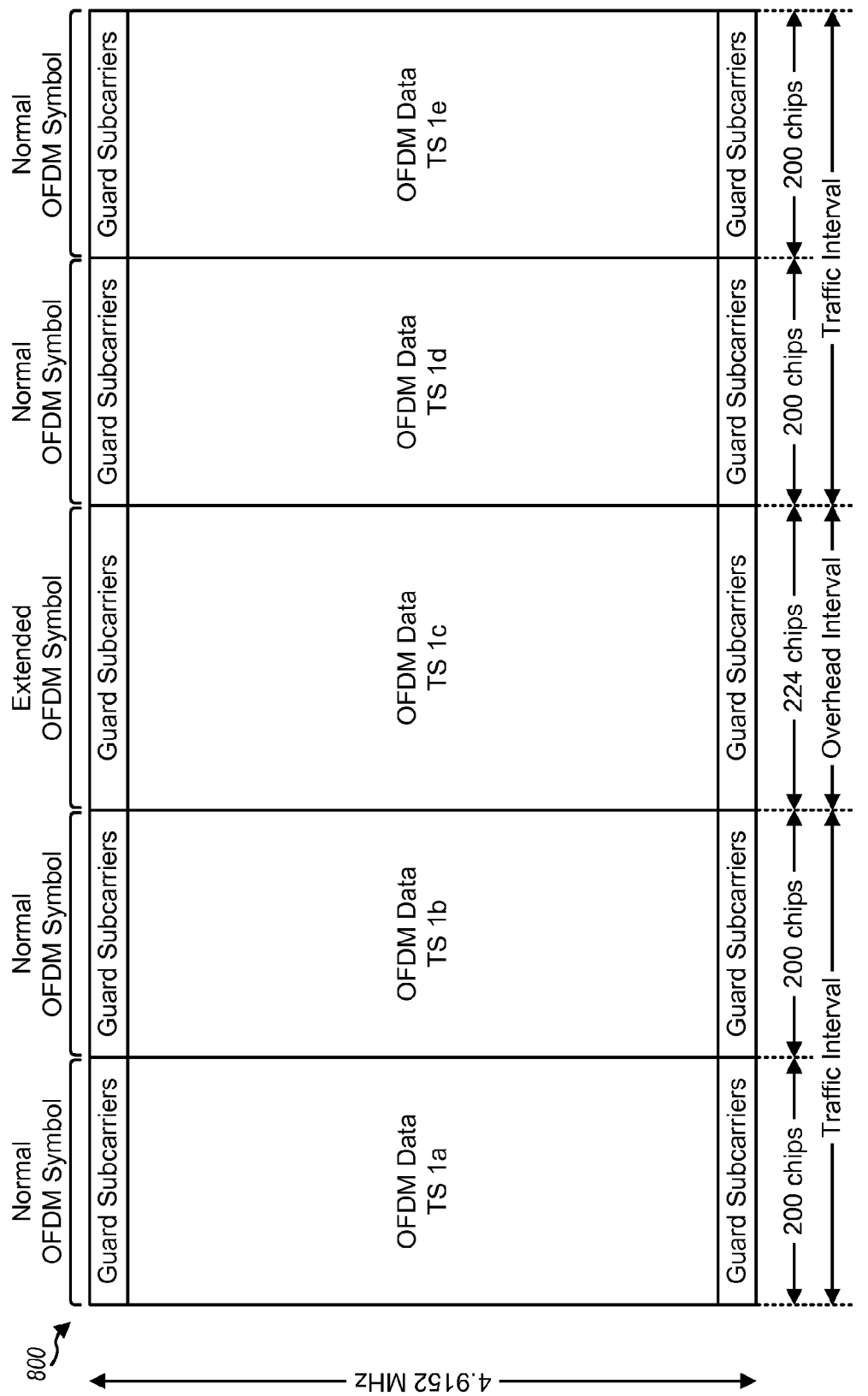
FIG. 8 shows a slot structure that supports OFDM in a 5 MHz spectral allocation.

FIG. 8 shows an HRPD slot structure 800 that supports OFDM in a 5 MHz spectral allocation. In the example shown in FIG. 8, the spectral allocation contains no HRPD carrier. The normal and long OFDM symbols may be used to send data in the entire available spectrum, except for the guard subbands at the band edges. Logical channel Ch1 may be defined to cover the entire usable spectrum. Logical channel Ch1 may be operated as if it is for an OFDM/OFDMA system and may incorporate design elements from other OFDM/OFDMA technologies such as Flash OFDM®, IEEE 802.20, LTE, etc. The time frequency resources in logical channel Ch1 may be partitioned into traffic resources used for traffic data, signaling resources used for signaling, pilot resources used for pilot, etc. The signaling resources may be used to schedule terminals and to assign traffic resources to the scheduled terminals. The signaling resources may also be used to facilitate hybrid automatic retransmission (H-ARQ) feedback, power control, etc. Various structural elements and physical layer features of Flash-OFDM®, IEEE 802.20, LTE and/or other OFDM/OFDMA systems may be employed for logical channel Ch1.

Figure 9:
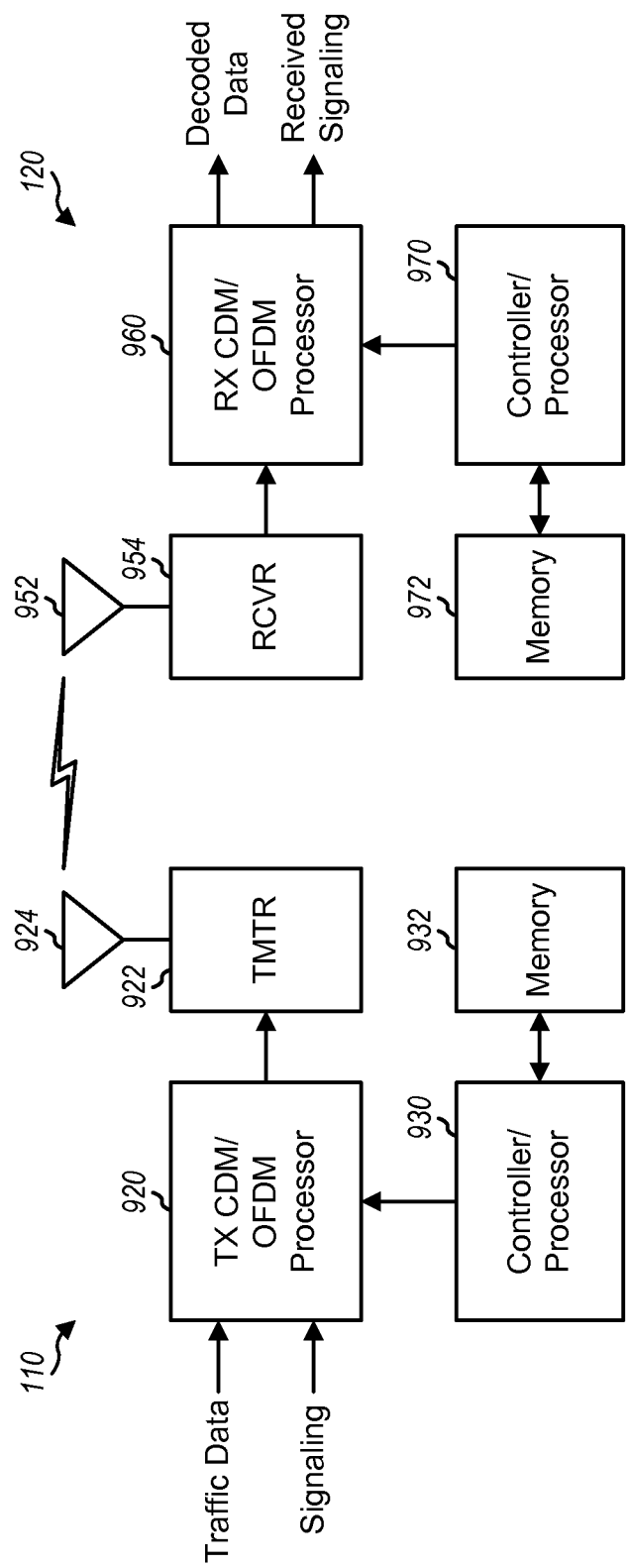
FIG. 9 shows a block diagram of an access point and a terminal.

FIG. 9 shows a block diagram of a design of an access point 110 and a terminal 120, which are one of the access points and terminals in FIG. 1. For simplicity, only processing units for transmission on the forward link are shown in FIG. 9.

At access point 110, a TX CDM/OFDM processor 920 receives and processes traffic data and signaling as described below and provides output samples. A transmitter (TMTR) 922 processes (e.g., converts to analog, amplifies, filters, and frequency upconverts) the output samples and generates a forward link signal, which is transmitted via an antenna 924. At terminal 120, an antenna 952 receives the forward link signal from access point 110 and provides a received signal to a receiver (RCVR) 954. Receiver 954 processes (e.g., filters, amplifies, frequency downconverts, and digitizes) the received signal and provides received samples. An RX CDM/OFDM processor 960 processes the received samples in a manner complementary to the processing by TX CDM/OFDM 920, as described below, and provides decoded data and received signaling for terminal 120.

Controllers 930 and 970 direct the operation at access point 110 and terminal 120, respectively. Memories 932 and 972 store program codes and data for access point 110 and terminal 120, respectively.

Figure 10:
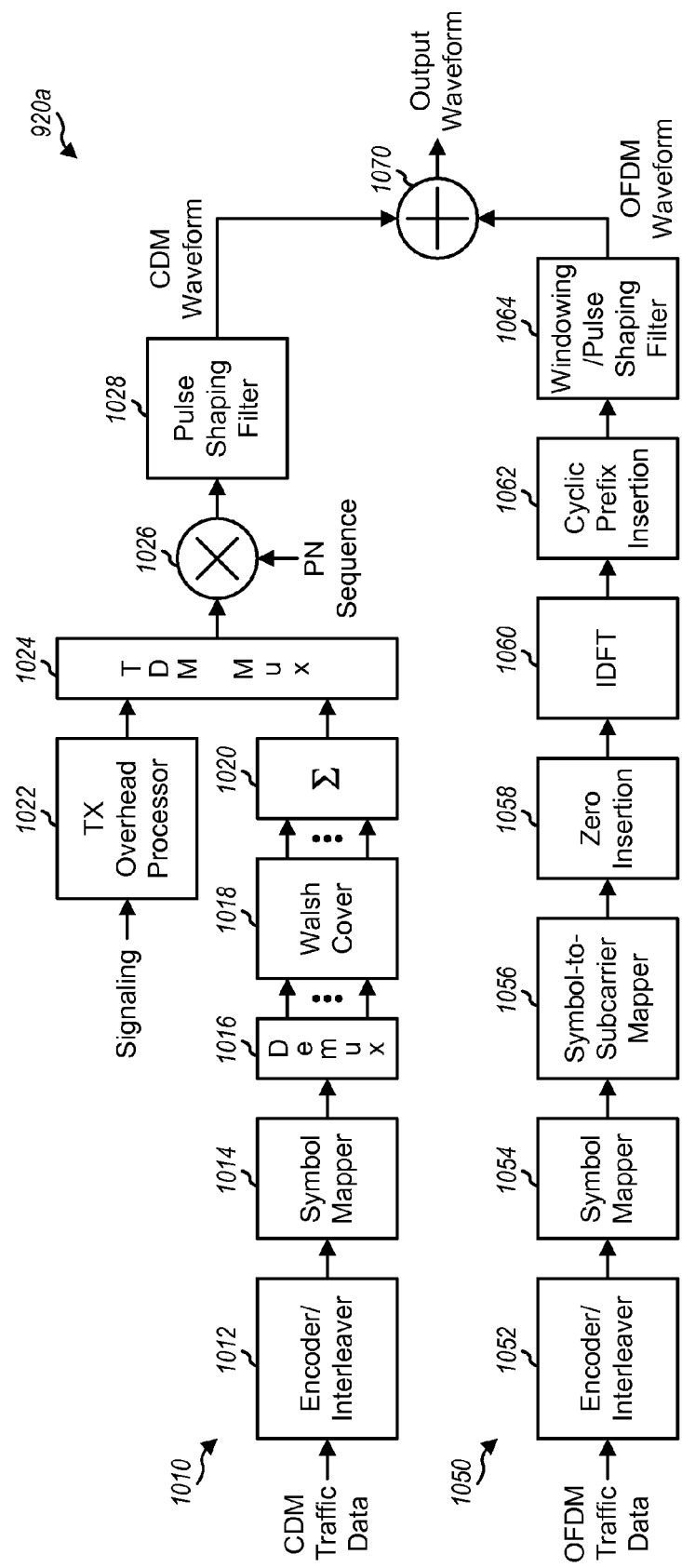
FIG. 10 shows a design of a transmit (TX) CDM/OFDM processor.

FIG. 10 shows a block diagram of a TX CDM/OFDM processor 920a, which is one design of TX CDM/OFDM processor 920 in FIG. 1. Processor 920a includes (i) a CDM processor 1010 that generates a CDM waveform carrying CDM data and overhead data and (ii) an OFDM processor 1050 that generates an OFDM waveform carrying OFDM data.

Within CDM processor 1010, an encoder/interleaver 1012 receives traffic data to be sent using CDM, encodes the traffic data based on a coding scheme, and interleaves (or reorders) the coded data. A symbol mapper 1014 maps the interleaved data to data symbols based on a modulation scheme. A demultiplexer (Demux) 1016 demultiplexes the data symbols into multiple (e.g., 16) streams. A Walsh cover unit 1018 covers or channelizes each data symbol stream with a different 16-chip Walsh code to obtain a corresponding data chip stream. A summer 1020 sums multiple (e.g., 16) data chip streams for multiple Walsh codes and provides CDM data at the chip rate. A TX overhead processor 1022 receives signaling for the MAC segments and pilot data for the pilot segment and generates overhead data at the chip rate for the overhead segment. A TDM multiplexer (Mux) 1024 receives the CDM data from summer 1020 and the overhead data from processor 1022, provides the CDM data in traffic segments carrying CDM data, and provides the overhead data in overhead segments. A multiplier 1026 multiplies the output of TDM multiplexer 1024 with a pseudo-noise (PN) sequence for the access point and provides output chips at the chip rate. A pulse shaping filter 1028 filters the output chips and provides a CDM waveform for one HRPD carrier. Multiple CDM waveforms for multiple HRPD carriers may be generated with multiple instances of CDM processor 1010. These multiple CDM waveforms may be upconverted to the proper frequencies in the digital domain or the analog domain.

Within OFDM processor 1050, an encoder/interleaver 1052 receives traffic data to be sent using OFDM, encodes the traffic data based on a coding scheme, and interleaves the coded data. A symbol mapper 1054 maps the interleaved data to data symbols. A symbol-to-subcarrier mapper 1056 maps the data symbols to subcarriers used for OFDM. A zero insertion unit 1058 inserts zero symbols (which have signal value of zero) on subcarriers not used for OFDM, e.g., subcarriers corresponding to CDM traffic segments and overhead segments, null subcarriers, and guard subcarriers. An inverse discrete Fourier transform (IDFT) unit 1060 performs a K-point IDFT on the data symbols and zero symbols for K total subcarriers in each OFDM symbol period and provides a useful portion containing K time-domain samples. K is dependent on OFDM symbol numerology and is given in Tables 1 and 2 for the normal and long OFDM symbols. A cyclic prefix insertion unit 1062 copies the last C samples of the useful portion and appends these C samples to the front of the useful portion to form an OFDM symbol containing K+C samples at the sample rate. The sample rate may be n times the chip rate, where n may be equal to 1, 2, 3, 4, etc. The repeated portion is referred to as a cyclic prefix and is used to combat ISI caused by frequency selective fading. A windowing/pulse shaping filter 1028 windows and filters the samples from unit 1062 and provides an OFDM waveform. A summer 1070 sums the CDM waveform from CDM processor 1010 and the OFDM waveform from OFDM processor 1050 and provides an output waveform.

FIG. 11 shows a block diagram of a TX CDM/OFDM processor 920*b*, which is another design of TX CDM/OFDM processor 920 in FIG. 1. Processor 920*b* maps CDM data to subcarriers used for CDM and maps OFDM data to subcarriers used for OFDM. Processor 920*b* then generates an output waveform based on the mapped CDM data and OFDM data.

Within processor 920*b*, a TX CDM processor 1110 receives and processes traffic data to be sent using CDM, signaling, and pilot and provides output chips. Processor 1110 may include units 1012 through 1026 in FIG. 10. A DFT unit 1112 performs an L-point DFT on the output chips in each OFDM symbol period and provides L frequency-domain symbols for L subcarriers. L is the number of subcarriers corresponding to an HRPD carrier and may be dependent on the OFDM symbol numerology.

An encoder/interleaver 1120 and a symbol mapper 1122 process traffic data to be sent using OFDM and provides data symbols. A symbol-to-subcarrier mapper 1130 maps the frequency-domain symbols from DFT unit 1112 to subcarriers used for CDM and further maps the data symbols from symbol mapper 1122 to subcarriers used for OFDM. A zero insertion unit 1132 inserts zero symbols on subcarriers not used for CDM or OFDM, e.g., null and guard subcarriers. An IDFT unit 1134 performs a K-point IDFT on K symbols for each OFDM symbol period and provides a useful portion containing K time-domain samples. A cyclic prefix insertion unit 1136 inserts a cyclic prefix to the useful portion and provides an OFDM symbol containing K+C samples at the sample rate. A windowing/pulse shaping filter 1138 windows and filters the samples from unit 1136 and provides an output waveform. Filter 1136 may provide sharper spectral roll-off than filter 1028 in FIG. 10, which may allow for better utilization of the spectral allocation.

Figure 12:
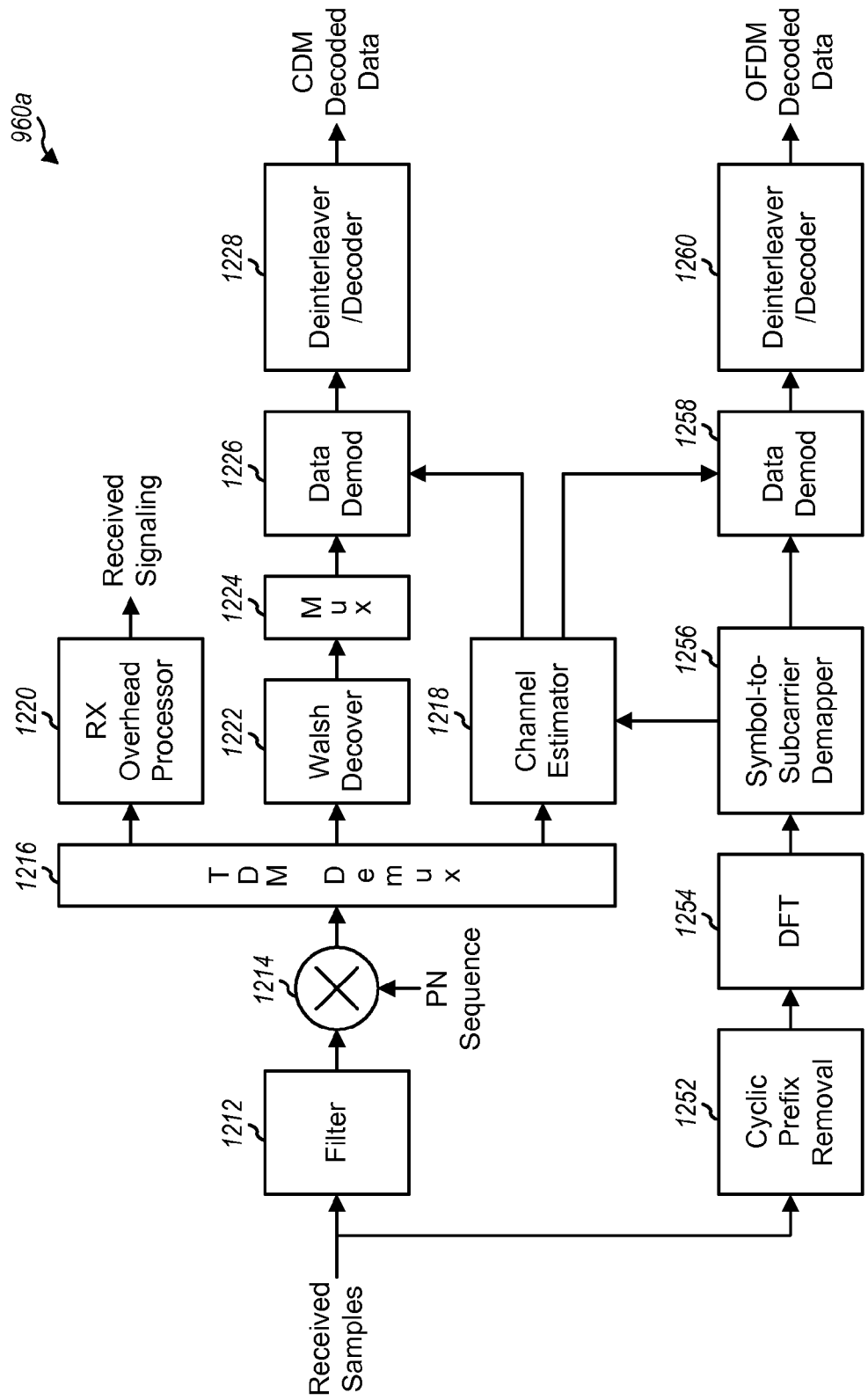
FIG. 12 shows a design of a receive (RX) CDM/OFDM processor.

FIG. 12 shows a block diagram of an RX CDM/OFDM processor 960*a*, which is one design of RX CDM/OFDM processor 960 in FIG. 9. Processor 960*a* may be used to receive the output waveform generated by TX CDM/OFDM processor 920*a* in FIG. 10.

To recover CDM data, a filter 1212 obtains received samples from receiver 954, filters the received samples to remove spectral components outside of an HRPD carrier of interest, performs conversion from sample rate to chip rate, and provides filtered chips. A multiplier 1214 multiplies the filtered chips with the PN sequence used by the access point and provides input chips. A TDM demultiplexer 1216 provides input chips for the pilot segment to a channel estimator 1218, provides input chips for the MAC segments to an RX overhead processor 1220, and provides input chips for traffic segments carrying CDM data to a Walsh decover unit 1222. Channel estimator 1218 derives a channel estimate based on the received pilot. Unit 1222 decovers or dechannelizes the input samples for each Walsh code used for the CDM data and provides received symbols. A multiplexer 1224 multiplexes the received symbols for all Walsh codes. A data demodulator (Demod) 1226 performs coherent detection on the received symbols with the channel estimate and provides data symbol estimates, which are estimates of the data symbols sent with CDM. A deinterleaver/decoder 1228 deinterleaves and decodes the data symbol estimates and provides decoded data for CDM. RX overhead processor 1220 processes the input chips for the MAC segments and provides received signaling.

To recover OFDM data, a cyclic prefix removal unit 1252 obtains K+C received samples in each OFDM symbol period, removes the cyclic prefix, and provides K received samples for the useful portion. A DFT unit 1254 performs a K-point DFT on the K received samples and provides K received symbols for the K total subcarriers. A symbol-to-subcarrier demapper 1256 obtains the received symbols for the K total subcarriers, provides received data symbols for the subcarriers used for OFDM to a data demodulator 1258, and may provide received pilot symbols to channel estimator 1218. Data demodulator 1258 performs data detection (e.g., matched filtering, equalization, etc.) on the received data symbols with the channel estimate from channel estimator 1218 and provides data symbol estimates, which are estimates of the data symbols sent with OFDM. A deinterleaver/decoder 1260 deinterleaves and decodes the data symbol estimates and provides decoded data for OFDM.

FIG. 13 shows a block diagram of an RX CDM/OFDM processor 960*b*, which is another design of RX CDM/OFDM processor 960 in FIG. 9. Processor 960*b* may be used to receive the output waveform generated by TX CDM/OFDM processor 920*b* in FIG. 11. Within processor 960*b*, a cyclic prefix removal unit 1312 obtains K+C received samples in each OFDM symbol period, removes the cyclic prefix, and provides K received samples for the useful portion. A DFT unit 1314 performs a K-point DFT on the K received samples and provides K received symbols for the K total subcarriers. A symbol-to-subcarrier demapper 1316 obtains the received symbols for the K total subcarriers, provides received symbols for subcarriers used for CDM to an IDFT unit 1320, and provides received symbols for subcarriers used for OFDM to a data demodulator 1330.

To recover CDM data, IDFT unit 1320 performs an L-point IDFT on L received symbols for subcarriers used for CDM in an OFDM symbol period and provides L time-domain samples. An RX CDM processor 1322 processes the time-domain samples and provides received signaling and decoded data for CDM. Processor 1322 may include units 1214 through 1228 in FIG. 12. To recover OFDM data, data demodulator 1330 performs data detection the received symbols from demapper 1316 with a channel estimate and provides data symbol estimates. A deinterleaver/decoder 1332 deinterleaves and decodes the data symbol estimates and provides decoded data for OFDM.

For clarity, various aspects of the techniques have been specifically described for forward link transmission with CDM and OFDM in an HRPD system. The techniques may also be used for other combinations of multiplexing schemes such as, e.g., CDM and SC-FDM, CDM and TDM and OFDM, TDM and OFDM, etc. The techniques may also be used for other wireless communication systems and for both the forward and reverse links.

In wireless systems, it may be inefficient to guarantee reliable data packet transfers on every single transmission. The inefficiency is particularly pronounced in systems where underlying channel conditions vary drastically from transmission to transmission. For example, in an OFDM system, there may be a wide variation in the received signal-to-noise ratio (SNR) between frames/packets, thus making it difficult and inefficient to guarantee a small frame error rate (FER) for each packet transmission. Such difficulty and in-efficiency also apply to other communication systems which employ orthogonal multiple access techniques including, but are not limited to, TDMA, FDMA, and CDM, etc.

In such communication systems, a packet retransmission mechanism such as an Automatic Retransmission/Repeat Request (ARQ) procedure may be used to help reduce such inefficiency. However, the ARQ procedure may cause higher packet latency since it may take longer on average for each packet to get through. In general, large packet latency may not be a significant problem for data traffic but may be unfavorable for voice traffic or other types of applications that require low latency in transmission of information. Moreover, packet transmission latency is expected to increase as the number of users in the system continues to grow. Thus, to improve system capacity (e.g., based on system throughput or number of users that simultaneously use the system, etc.), transmission latency should be kept low or small. The ARQ typically includes an acknowledgement/negative acknowledgement (ACK/NACK) signal to indicate whether the terminal has successfully received a packet. As a non-limiting example, the terminal may evaluate an incoming packet using a checking algorithm such as a hash function that includes a checksum of the data transferred. One such hash function is a Cyclic Redundancy Check (CRC), which may be used to determine that the packet was received correctly with no erroneous bits. If the CRC evaluates successfully, all the bits in the packet are correct and the terminal may issue an ACK indicating that the terminal does not need the packet re-sent. If the CRC evaluates incorrectly, all the bits in the packet may not be correct and the terminal may issue a NACK indicating that the terminal needs the packet re-sent.

Embodiments of the present invention employ a packet transmission on the forward link using a half slot rather than a full slot used in conventional forward links. The half-slot transmission enables more granularity in packet size and, as a result, more opportunities for successful transmission of the smaller packet. While the latency may be the same, the smaller granularity means smaller data sizes for each sub-packet and more opportunity that it will be transmitted correctly without the need to retransmit any given sub-packet. The half-slot may transmit a packet or a sub-packet (i.e., a portion of a packet) depending on the packet size and half-slot payload size. "Packet" as used herein generally refers to the payload of a slot or the payload of a half-slot. Those of ordinary skill in the art will recognize that these slot-defined packets may include a conventional data packet or a sub-packet of a conventional data packet.

Figure 14A:
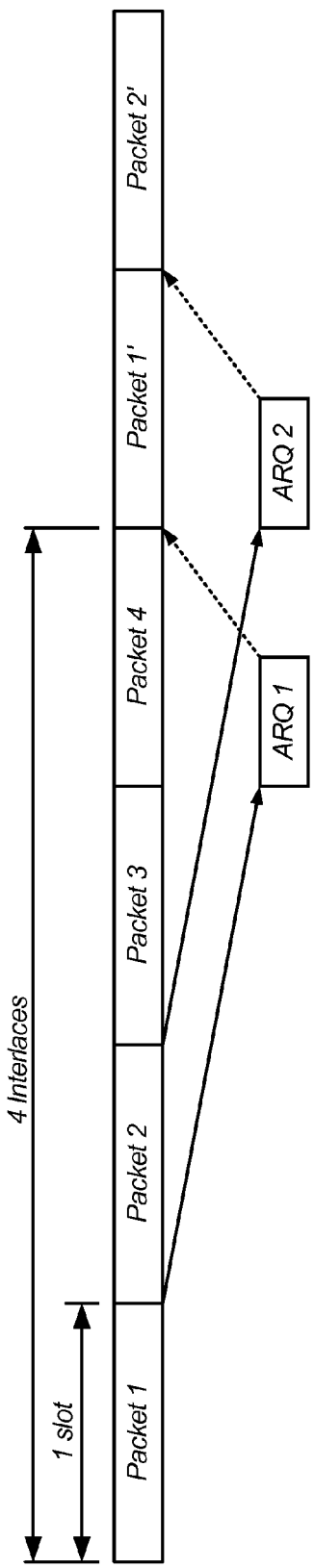
FIG. 14A shows packet transmissions for a conventional full slot packet protocol.
Figure 14B:
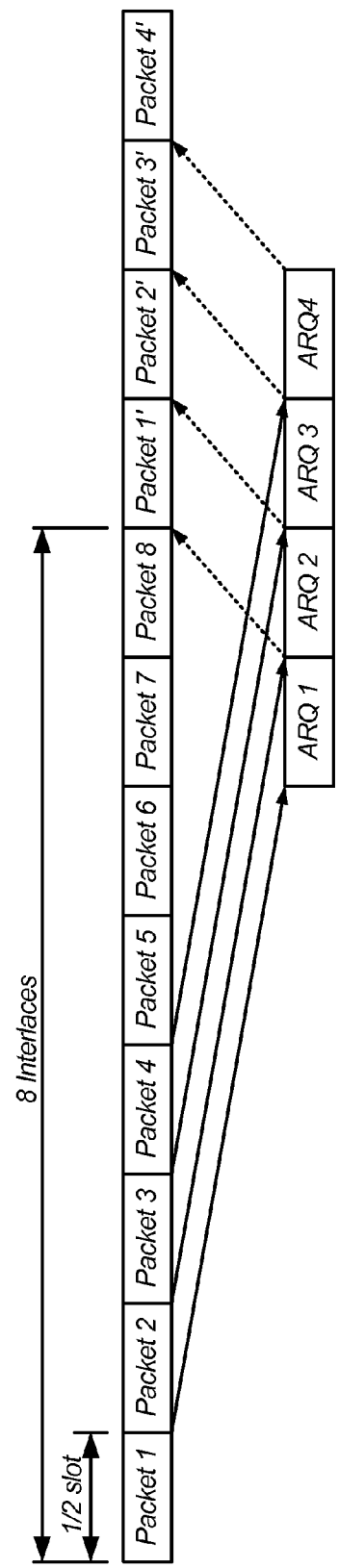
FIG. 14B shows packet transmissions for using a half-slot packet protocol according to embodiments of the present invention.

FIG. 14A illustrates packet transmissions for a conventional full slot packet protocol. FIG. 14B illustrates packet transmissions using a half-slot packet protocol according to embodiments of the present invention. In FIG. 14A each packet (or sub-packet) occupies a slot and the transmission channel is configured with four interlaces to illustrate that there may be four different streams of data packets destined to the same or different terminals within the interlace.

Once a packet is transmitted from the access point to a terminal it may take the terminal two slots to begin responding with and ARQ containing the ACK/NACK information. The ARQ may be a half-slot in duration and returned on the reverse link as shown in FIG. 14A. Thus, the earliest opportunity for the access point to re-send a packet if it receives a NACK is four packets after the original packet was sent. As a result, four interlaces allow for determination of whether any given data stream can send a new packet or resend the previous packet based on the ACK/NACK information.

As shown in FIG. 14A the access point sends packet 1, packet 2, packet 3, and packet 4 in the first interlace. During the packet 4 time, the terminal that received and decoded packet 1 responds with an ARQ1 including the ACK/NACK information for packet 1. Thus, with the ACK/NACK information the access point may send out packet 1' as a new packet for the first data stream if an ACK was received or re-send the previously sent packet for the first data stream if a NACK was received. Similarly, during the packet 1' time, an ARQ2 for packet 2 from the second data stream is sent and the access point can respond with a new packet or a re-sent packet at the packet 2' time.

FIG. 14B illustrates packet transmissions for using a half-slot packet protocol according to embodiments of the present invention. In FIG. 14B, each packet (or sub-packet) occupies a half-slot and the transmission channel may be configured, as a non-limiting example, with eight interlaces to illustrate that there may be eight different streams of data packets destined to the same or different terminals within the interlace. Thus, embodiments of the present invention allow more data streams to be interlaced within a given four-slot block. In addition, the half-slot granularity means smaller data sizes for each sub-packet and more opportunity that it will be transmitted correctly without the need to retransmit any given packet.

As shown in FIG. 14B the access point sends packets 1-8 in the first interlace. During the packet 7 time, which is the same latency as the conventional stream of FIG. 14A, the terminal that received and decoded packet 1 responds with an ARQ1 including the ACK/NACK information for packet 1. Thus, with the ACK/NACK information the access point may send out packet 1' as a new packet for the first data stream if an ACK was received or re-send the previously sent packet for the first data stream if a NACK was received. Similarly, during the packet 8 time, an ARQ2 for packet 2 from the second data stream is sent and the access point can respond with a new packet or a re-sent packet at the packet 2' time. A similar mechanism may be used for each half-slot packet as illustrated for ARQ3 and ARQ4.

In addition, while not shown in a single figure, the configuration of FIG. 14A with four interlaces of full slots may be combined with the eight interlaces of half-slots, as shown in FIG. 14B. As a non-limiting example, in FIG. 14B half-slot packets 3 and 4 could be combined into a single full slot packet. As a result, the ARQ for that full slot packet would occur at the ARQ3 time and there would be no ARQ 4. Alternatively, any given four-slot segment may comprise four interlaces of full slots or eight interlaces of half-slots. In other words, as a non-limiting example, four interlaces of full slots may be followed by eight interlaces of half-slots, which may be followed by four interlaces of full slots.

FIG. 15 shows various modulation orders relative to payload size and number of re-tries that may be used in embodiments of the present invention. Each time the access point has to re-send a packet it may change the modulation to have a better chance of sending the packet successfully. In addition, a terminal may measure the quality of the forward link channel and transmits such information to the access point. The access point may use the received channel conditions to predict an acceptable transmission format, rate of the next packet transmission. As a non-limiting example, the terminal may use a channel quality feedback channel (CQICH) to convey channel quality measurements of the best serving sector to the base station. The channel quality may be measured in terms of a carrier-in-interference (C/I) ratio based upon received forward link signals. The C/I value may be mapped onto a channel quality indicator (CQI) symbol.

In addition, the terminal may provide Data Rate Control (DRC) information to the access point. The DRC information may be based, for example, on C/I measurements from previous forward link transmissions. The access point may use the DRC information to determine what type of modulation to use for the packets subsequent to receipt of the DRC information.

Spectral efficiency is determined by the modulation scheme. Various modulation schemes may be used for data transmission. Each modulation scheme is associated with a signal constellation that contains M signal points, where M>1. Each signal point is defined by a complex value and is identified by a B-bit binary value, where B>=1 and 2B=M. For symbol mapping, the code bits to be transmitted are first grouped into sets of B code bits. Each set of B code bits forms a B-bit binary value that is mapped to a specific signal point, which is then transmitted as a modulation symbol for that group of B code bits. Each modulation symbol thus carries information for B code bits. Some non-limiting example modulation processes that may be used in embodiments of the present invention are Quadrature Phase Shift Keying scheme (QPSK), 8-Phase Shift Keying scheme (8-PSK), and 16-Quadrature Amplitude Modulation (16-QAM) and 64 QAM.

Thus, as an example from FIG. 15, for a payload size of 4096 bits the first time a packet is sent it may be sent with modulation order 6 (i.e., 64QAM). If the packet has to be re-sent, the second time the packet is sent it may be sent again with modulation order 6 (i.e., 64QAM). However, if the packet needs to be resent a second time (i.e., the third transmission) the access point may modify the modulation to modulation order 4 (i.e., 16QAM). Those of ordinary skill in the art will recognize that for smaller payload sizes a smaller modulation order may be used and still fit within the half-slot packet size.

FIG. 16 shows various data rates that may be achieved relative to payload size and number of re-tries. The data rates on FIG. 16 correspond to the payload size, transmission number, and modulation order from FIG. 15.

Figure 17:
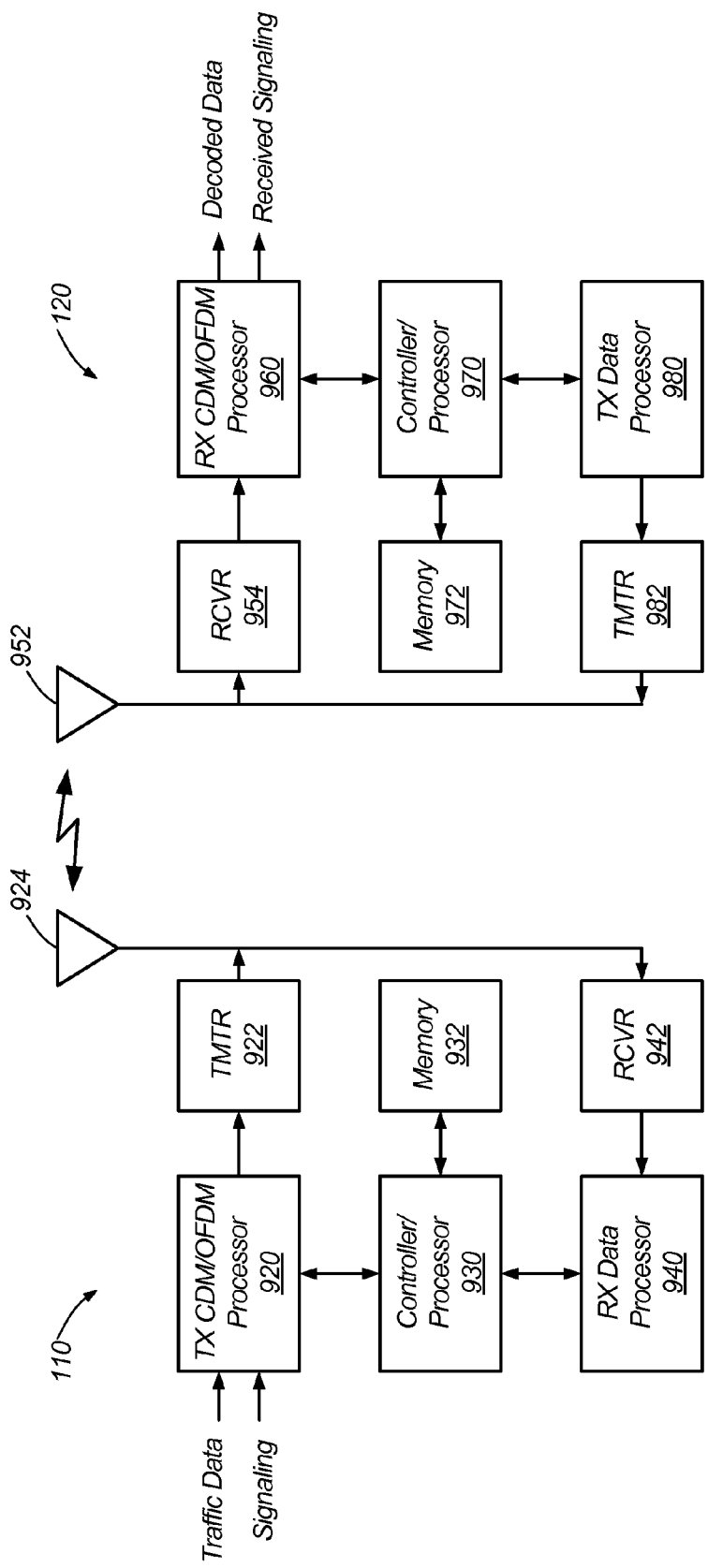
FIG. 17 shows a block diagram of an access point and a terminal.

FIG. 17 shows a block diagram of an access point and a terminal. This block diagram is similar to the block diagram of FIG. 9 except that operational blocks used in the transmission and reception of the reverse link are also shown. Thus, the functional description of the forward link described above with respect to FIG. 9 is equally applicable to FIG. 17.

For the reverse link, in the terminal, controller 970 uses the data from RX CDM/OFDM processor 960 and determines whether the packet from a half-slot has been received successfully as has been explained earlier. The controller 970 and TX data processor 980 then assembles an ARQ and send it to the transmitter (TMTR) 982 for transmission to the access point through antenna 952. On the access point side, receiver (RCVR) 942 receives the reverse link information through antenna 924. The RX data processor 940 and controller 930 decode the ARQ to retrieve information such as the ACK/NACK information, forward link quality information such as the CQI, and data rate control information such as the DRC.

Using a combination of the DRC, the CQI, and the ACK/NACK information, the controller may decide whether the next packet for that channel should be sent with a different modulation scheme.

Figure 18:
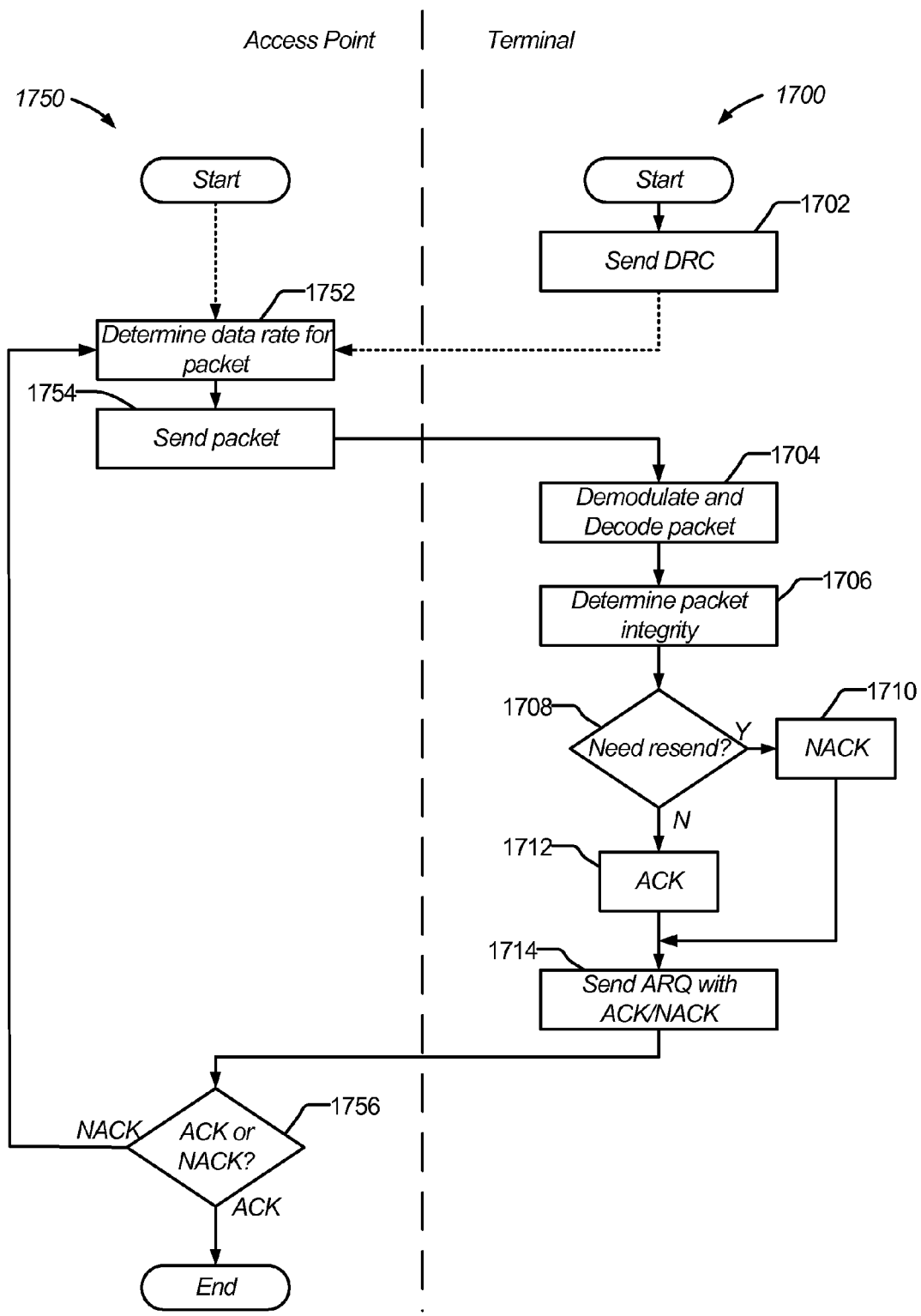
FIG. 18 shows a process for sending and receiving half-slot packets.

FIG. 18 shows a process for sending and receiving half-slot packets. Process elements on the left side are access point processes 1750 that may be carried out by the access point and process elements on the right side are terminal process 1700 that may be carried out by the terminal. The processes illustrated are for the sending and potentially re-sending of a given packet for a given data stream. Those of ordinary skill in the art will recognize that many other processes are involved for sending and monitoring multiple packets in a data stream as well as sending and monitoring multiple data streams.

A packet sending process may begin at process 1702 with the sending of DRC information from the terminal to the access point. Alternatively, the access point may begin processing of a packet without DRC information. This is particularly true for subsequent packets in a data stream. From either starting point process 1752 determines a data rate and modulation scheme for the packet. This determination may be influenced by the DRC information if it is present as well as the payload size. Then, process 1754 sends the packet in the half-slot to the terminal. Of course, other processes may be happening to fill other traffic segments or half-slots within any given slot in preparation for transmission.

Process 1704 indicates that the terminal demodulates and decodes the received slot and specifically the half-slot of interest for this packet. Process 1706 determines the packet integrity, which may include performing a CRC to determine if the data was received successfully, analyzing the channel quality to develop a CQI, or combinations thereof. Decision block 1708 indicates that if bit errors were received a re-send may be needed. If a resend is needed, process 1710 defines that a NACK should be sent. If a resend is not needed, process 1712 defines that an ACK should be sent. Process 1714 indicates that the ARQ is sent including at least the ACK/NACK information. The ARQ may also include other information, such as, for example, the CQI information and DRC information.

Decision block 1756 indicates that the access point determines whether an ACK or a NACK was received as part of the ARQ. If an ACK was received the process exits because there is no need to re-send the current packet. For subsequent packets in the data stream, the process would repeat with entry to the start process of either the access point process 1750 or the terminal process 1700.

If a NACK is received, the process loops to 1752 to determine a data rate for the packet. On loops back, the data rate determination may be influenced by a combination of number of re-tries (not shown in FIG. 18), payload size, DRC information if it is present, and CQI information if it is present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Furthermore, a software module may be transmitted to a terminal or an access point for storage and execution thereon.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An apparatus for sub-slot packet communication comprising:
   a receiver to receive channel information from a remote station, the channel information including ACK/NACK (acknowledgement/negative acknowledgement) information;
   at least one processor configured to:
     generate an output waveform comprising at least one slot, each slot segmented into two half-slots, wherein at least one half-slot includes at least a portion of a packet; and
     interpret the ACK/NACK information to determine if the packet should be resent to the remote station;
     wherein the output waveform is compatible with that of a legacy system based on transmissions on full slots, and wherein at least one half-slot of the output waveform comprises:
       (A) at least one traffic segment, at a center of the half-slot, that carries an integer number of orthogonal frequency division multiplexing (OFDM) data symbols; and
       (B) at least one overhead segment, at the center of the half-slot, that has a duration equal to a duration of said traffic segment and includes a pilot segment;
   a memory coupled to the at least one processor; and
   a transmitter configured for transmitting the output waveform.

2. The apparatus of claim 1, wherein the output waveform further comprises at least one additional slot wherein the at least one additional slot contains at least a portion of a packet selected from the group consisting of: from the packet and configured for a full slot, from another packet and configured for a half-slot, and from another packet and configured for a full slot.

3. The apparatus of claim 1, wherein the output waveform is further configured as eight interleaves of half-slots, four interleaves of full slots, or combinations thereof.

4. The apparatus of claim 1, wherein:
   the channel information further comprises data rate control information; and
   the at least one processor is further configured to select a first modulation for the packet responsive to the data rate control information.

5. The apparatus of claim 1, wherein:
   the at least one processor is further configured to generate the output waveform with a modulation correlated to a payload size for the at least one half-slot.

6. The apparatus of claim 1, wherein:
   the at least one processor is further configured to generate a new output waveform with a different modulation for the packet if the ACK/NACK information indicates that the packet should be resent; and
   the transmitter is further configured for transmitting the new output waveform.

7. The apparatus of claim 6, wherein the different modulation of the new output waveform is selected to be at a lower data rate than a modulation of the output waveform.

8. The apparatus of claim 6, wherein the different modulation is selected from the group consisting of quadrature phase shift keying, 8-phase shift keying, 16-quadrature amplitude modulation and 64-quadrature amplitude modulation.

9. The apparatus of claim 1, wherein:
the channel information further comprises a channel quality indicator;
the at least one processor is further configured to:
interpret the channel quality indicator; and
generate a new output waveform with a different modulation for subsequent packets responsive to the interpreted channel quality indicator; and
the transmitter is further configured for transmitting the new output waveform.

10. The apparatus of claim 9, wherein the different modulation is selected from the group consisting of quadrature phase shift keying, 8-phase shift keying, 16-quadrature amplitude modulation and 64-quadrature amplitude modulation.

11. The apparatus of claim 1, wherein the at least one processor is further configured to:
generate the output waveform comprised of first and second traffic segments and an overhead segment, each of the first and second traffic segments carrying code division multiplexing (CDM) data or orthogonal frequency division multiplexing (OFDM) data, and the overhead segment carrying overhead data.

12. The apparatus of claim 1, wherein the at least one processor is further configured to:
select code division multiplexing (CDM) or orthogonal frequency division multiplexing (OFDM) for each of multiple traffic segments for multiple carriers; and
generate the output waveform comprised of the multiple traffic segments for the multiple carriers, each traffic segment carrying CDM data or OFDM data.

13. The apparatus of claim 1, wherein the at least one processor is further configured to:
generate a first waveform comprised of traffic segments carrying code division multiplexing (CDM) data;
generate a second waveform comprised of traffic segments carrying orthogonal frequency division multiplexing (OFDM) data; and
generate the output waveform based on the first and second waveforms.

14. A method for sub-slot packet communication comprising:
receiving channel information from a remote station, the channel information including ACK/NACK (acknowledgement/negative acknowledgement) information;
generating an output waveform comprising at least one slot, each slot segmented into two half-slots, wherein at least one half-slot includes at least a portion of a packet;
interpreting the ACK/NACK information to determine if the packet should be resent to the remote station; and
transmitting the output waveform,
wherein the output waveform is compatible with that of a legacy system based on transmissions on full slots, and wherein at least one half-slot of the output waveform comprises:
(A) at least one traffic segment, at a center of the half-slot, that carries an integer number of orthogonal frequency division multiplexing (OFDM) data symbols; and
(B) at least one overhead segment, at the center of the half-slot, that has a duration equal to a duration of said traffic segment and includes a pilot segment.

15. The method of claim 14, wherein the output waveform further comprises at least one additional slot wherein the at least one additional slot contains at least a portion of a packet selected from the group consisting of: from the packet and configured for a full slot, from another packet and configured for a half-slot, and from another packet and configured for a full slot.

16. The method of claim 14, wherein the output waveform is further configured as eight interleaves of half-slots, four interleaves of full slots, or combinations thereof.

17. The method of claim 14, wherein the channel information further comprises data rate control information; and further comprising selecting a first modulation for the packet responsive to the data rate control information.

18. The method of claim 14 further comprising generating the output waveform with a modulation correlated to a payload size for the at least one half-slot.

19. The method of claim 14 further comprising:
generating a new output waveform with a different modulation for the packet if the ACK/NACK information indicates that the packet should be resent; and
transmitting the new output waveform.

20. The method of claim 19, wherein the different modulation of the new output waveform is selected to be at a lower data rate than a modulation of the output waveform.

21. The method of claim 19, wherein the different modulation is selected from the group consisting of quadrature phase shift keying, 8-phase shift keying, 16-quadrature amplitude modulation and 64-quadrature amplitude modulation.

22. The method of claim 14, wherein the channel information further comprises a channel quality indicator; and further comprising:
interpreting the channel quality indicator;
generating a new output waveform with a different modulation for subsequent packets responsive to the interpreted channel quality indicator; and
transmitting the new output waveform.

23. The method of claim 22, wherein the different modulation is selected from the group consisting of quadrature phase shift keying, 8-phase shift keying, 16-quadrature amplitude modulation and 64-quadrature amplitude modulation.

24. The method of claim 14 further comprising generating the output waveform comprised of first and second traffic segments and an overhead segment, each of the first and second traffic segments carrying code division multiplexing (CDM) data or orthogonal frequency division multiplexing (OFDM) data, and the overhead segment carrying overhead data.

25. The method of claim 14 further comprising:
selecting code division multiplexing (CDM) or orthogonal frequency division multiplexing (OFDM) for each of multiple traffic segments for multiple carriers; and
generating the output waveform comprised of the multiple traffic segments for the multiple carriers, each traffic segment carrying CDM data or OFDM data.

26. The method of claim 14 further comprising:
generating a first waveform comprised of traffic segments carrying code division multiplexing (CDM) data;
generating a second waveform comprised of traffic segments carrying orthogonal frequency division multiplexing (OFDM) data; and
generating the output waveform based on the first and second waveforms.

27. An apparatus for sub-slot packet communication comprising:
means for receiving channel information from a remote station, the channel information including ACK/NACK (acknowledgement/negative acknowledgement) information;

means for generating an output waveform comprising at least one slot, each slot segmented into two half-slots, wherein at least one half-slot includes at least a portion of a packet;

means for interpreting the ACK/NACK information to determine if the packet should be resent to the remote station; and means for transmitting the output waveform, wherein the output waveform is compatible with that of a legacy system based on transmissions on full slots, and wherein at least one half-slot of the output waveform comprises:
- (A) at least one traffic segment, at a center of the half-slot, that carries an integer number of orthogonal frequency division multiplexing (OFDM) data symbols; and
- (B) at least one overhead segment, at the center of the half-slot, that has a duration equal to a duration of said traffic segment and includes a pilot segment.

28. The apparatus of claim 27, wherein the output waveform further comprises at least one additional slot wherein the at least one additional slot contains at least a portion of a packet selected from the group consisting of: from the packet and configured for a full slot, from another packet and configured for a half-slot, and from another packet and configured for a full slot.

29. The apparatus of claim 27, wherein the output waveform is further configured as eight interleaves of half-slots, four interleaves of full slots, or combinations thereof.

30. The apparatus of claim 27, wherein the channel information further comprises data rate control information; and further comprising means for selecting a first modulation for the packet responsive to the data rate control information.

31. The apparatus of claim 27 further comprising means for generating the output waveform with a modulation correlated to a payload size for the at least one half-slot.

32. The apparatus of claim 27, wherein said means for generating the output waveform is further configured to generate a new output waveform with a different modulation for the packet if the ACK/NACK information indicates that the packet should be resent; and
wherein said means for transmitting is arranged to transmit the new output waveform.

33. The apparatus of claim 32, wherein the different modulation of the new output waveform is selected to be at a lower data rate than a modulation of the output waveform.

34. The apparatus of claim 32, wherein the different modulation is selected from the group consisting of quadrature phase shift keying, 8-phase shift keying, 16-quadrature amplitude modulation and 64-quadrature amplitude modulation.

35. The apparatus of claim 27, wherein the channel information further comprises a channel quality indicator; and further comprising means for interpreting the channel quality indicator,
wherein said means for generating the output waveform is further configured to generate a new output waveform with a different modulation for subsequent packets responsive to the interpreted channel quality indicator and
wherein said means for transmitting is arranged to transmit the new output waveform.

36. The apparatus of claim 35, wherein the different modulation is selected from the group consisting of quadrature phase shift keying, 8-phase shift keying, 16-quadrature amplitude modulation and 64-quadrature amplitude modulation.

37. The apparatus of claim 27 further comprising means for generating the output waveform comprised of first and second traffic segments and an overhead segment, each of the first and second traffic segments carrying code division multiplexing (CDM) data or orthogonal frequency division multiplexing (OFDM) data, and the overhead segment carrying overhead data.

38. The apparatus of claim 27 further comprising:
means for selecting code division multiplexing (CDM) or orthogonal frequency division multiplexing (OFDM) for each of multiple traffic segments for multiple carriers; and
means for generating the output waveform comprised of the multiple traffic segments for the multiple carriers, each traffic segment carrying CDM data or OFDM data.

39. The apparatus of claim 27 further comprising:
means for generating a first waveform comprised of traffic segments carrying code division multiplexing (CDM) data;
means for generating a second waveform comprised of traffic segments carrying orthogonal frequency division multiplexing (OFDM) data; and
means for generating the output waveform based on the first and second waveforms.

40. A computer program product embodied on a non-transitory computer-readable storage medium and comprising code that, when executed, causes a computer to perform the following:
receiving channel information from a remote station, the channel information including ACK/NACK (acknowledgement/negative acknowledgement) information;
generating an output waveform comprising at least one slot, each slot segmented into two half-slots, wherein at least one half-slot includes at least a portion of a packet;
interpreting the ACK/NACK information to determine if the packet should be resent to the remote station; and
transmitting the output waveform,
wherein the output waveform is compatible with that of a legacy system based on transmissions on full slots, and wherein at least one half-slot of the output waveform comprises:
- (A) at least one traffic segment, at a center of the half-slot, that carries an integer number of orthogonal frequency division multiplexing (OFDM) data symbols; and
- (B) at least one overhead segment, at the center of the half-slot, that has a duration equal to a duration of said traffic segment and includes a pilot segment.

41. The computer program product of claim 40 further comprising code for generating the output waveform with a modulation correlated to a payload size for the at least one half-slot.

42. The computer program product of claim 40 further comprising code for:
generating a new output waveform with a different modulation for the packet if the ACK/NACK information indicates that the packet should be resent; and
transmitting the new output waveform.

43. The computer program product of claim 42, wherein the different modulation of the new output waveform is selected to be at a lower data rate than a modulation of the output waveform or is selected from the group consisting of quadrature phase shift keying, 8-phase shift keying, 16-quadrature amplitude modulation and 64-quadrature amplitude modulation.

44. The computer program product of claim 40, wherein the channel information further comprises a channel quality indicator; and further comprising code for:
  interpreting the channel quality indicator;
  generating a new output waveform with a different modulation for subsequent packets responsive to the interpreted channel quality indicator; and
  transmitting the new output waveform.

45. The computer program product of claim 40 further comprising code for:
  generating a first waveform comprised of traffic segments carrying code division multiplexing (CDM) data;
  generating a second waveform comprised of traffic segments carrying orthogonal frequency division multiplexing (OFDM) data; and
  generating the output waveform based on the first and second waveforms.

46. The apparatus of claim 1, wherein said output waveform fills a given spectral allocation.

47. The apparatus of claim 1, wherein said traffic segment and said overhead segment occupy adjacent spectral portions of said output waveform.

48. The apparatus of claim 1, wherein the output waveform is compliant with at least one among High Rate Packet Data (HRPD) Revision 0, HRPD Revision A, and HRPD Revision B.

49. The method of claim 14, wherein said output waveform fills a given spectral allocation.

50. The method of claim 14, wherein said traffic segment and said overhead segment occupy adjacent spectral portions of said output waveform.

51. The method of claim 14, wherein the output waveform is compliant with at least one among High Rate Packet Data (HRPD) Revision 0, HRPD Revision A, and HRPD Revision B.

52. The apparatus of claim 48, wherein a sample rate of said OFDM data symbols is an integer multiple of a chip rate of said overhead segment.

53. The method of claim 51, wherein a sample rate of said OFDM data symbols is an integer multiple of a chip rate of said overhead segment.

* * * * *